United States Patent
Kudo et al.

(10) Patent No.: US 11,134,199 B2
(45) Date of Patent: Sep. 28, 2021

(54) IMAGE PICKUP APPARATUS, IMAGE DISPLAY METHOD FOR IMAGE PICKUP APPARATUS, AND RECORDING MEDIUM

(71) Applicant: Olympus Corporation, Hachioji (JP)

(72) Inventors: Hiroki Kudo, Hachioji (JP); Kazuki Sakurai, Hachioji (JP); Hiroki Koyama, Hachioji (JP); Takeshi Suzuki, Hachioji (JP); Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/112,152

(22) Filed: Dec. 4, 2020

(65) Prior Publication Data

US 2021/0195116 A1 Jun. 24, 2021

Related U.S. Application Data

(63) Continuation of application No. PCT/JP2019/050393, filed on Dec. 23, 2019.

(51) Int. Cl.
*H04N 5/232* (2006.01)
*H04N 5/225* (2006.01)

(52) U.S. Cl.
CPC ............. *H04N 5/232945* (2018.08); *H04N 2005/2255* (2013.01)

(58) Field of Classification Search
CPC .. H04N 5/23238; H04N 5/23293; H04N 7/18; G06T 3/4038; G09G 5/02
USPC ............................. 348/79; 345/589, 173–178
See application file for complete search history.

(56) References Cited

U.S. PATENT DOCUMENTS

2017/0366754 A1* 12/2017 Feng ..................... H04N 5/144

FOREIGN PATENT DOCUMENTS

| JP | H06274639 A | 9/1994 |
|---|---|---|
| JP | 11-015044 A | 1/1999 |
| JP | 11-249203 A | 9/1999 |
| JP | H11295782 A | 10/1999 |
| JP | 2007-180931 A | 7/2007 |
| JP | 3978784 B | 7/2007 |
| JP | 2008-124899 A | 5/2008 |
| JP | 2010-212827 A | 9/2010 |
| JP | 5223950 B | 3/2013 |
| JP | 2015-040906 A | 3/2015 |

OTHER PUBLICATIONS

PCT International Search Report to corresponding International Application No. PCT/JP2019/050393.

* cited by examiner

*Primary Examiner* — Xi Wang
(74) *Attorney, Agent, or Firm* — John C. Pokotylo; Pokotylo Patent Services

(57) ABSTRACT

An image pickup apparatus includes an image pickup device, a display device including, in a finder loupe visual field, an image display region and an image display outside region, and a display controller configured to control the display device. The display controller determines a difficulty degree of visibility of a boundary between the image display region and the image display outside region and controls the display device to draw a boundary display when the difficulty degree is equal to or larger than a predetermined value and not to draw the boundary display when the difficulty degree is smaller than the predetermined value.

10 Claims, 15 Drawing Sheets

IMAGE PICKUP APPARATUS, IMAGE DISPLAY METHOD FOR IMAGE PICKUP APPARATUS, AND RECORDING MEDIUM

CROSS REFERENCE TO RELATED APPLICATION

This application is a continuation application of PCT/JP2019/050393 filed on Dec. 23, 2019, the entire contents of which are incorporated herein by this reference.

BACKGROUND OF THE INVENTION

1. Field of the Invention

The present invention relates to an image pickup apparatus that picks up an optical image to generate a picked-up image and displays a recorded image, which is a part of or a whole of the picked-up image, an image display method for the image pickup apparatus, and a recording medium.

2. Description of the Related Art

Conventionally, there has been proposed various techniques such as multi-aspect, digital teleconverter, and digital zoom for displaying, on a finder, a part of or a whole of a picked-up image generated by an image pickup device.

For example, Japanese Patent Application Laid-Open Publication No. 2007-180931 and Japanese Patent No. 3978784 describe a technique for setting, according to a change in an aspect ratio, an excess display space outside an image display region as a black solid display region or a photographing information display region to distinguishably live-view display a region of a finally recorded image and a region other than the region.

Japanese Patent No. 5223950 describes a technique such as digital teleconverter or digital zoom for, when photographing a part of a photographing region of an image pickup device, live-view displaying the entire photographing region, further drawing, in the live-view display, an image range to be recorded, and displaying the image range to a photographer.

SUMMARY OF THE INVENTION

An image pickup apparatus according to an aspect of the present invention includes: an image pickup device configured to pick up an optical image and generate a picked-up image; a display device including, in a finder loupe visual field, an image display region where a recorded image, which is a part of or a whole of the picked-up image, is drawn in a drawn region and an image display outside region other than the image display region; and a display controller configured to control the display device to draw, in the drawn region, a boundary display for making a boundary between the image display region and the image display outside region visually recognizable. The display controller determines a difficulty degree of visibility of the boundary between the image display region and the image display outside region and controls the display device to draw the boundary display when the difficulty degree is equal to or larger than a predetermined value and not to draw the boundary display when the difficulty degree is smaller than the predetermined value.

An image pickup apparatus according to an aspect of the present invention includes: an image pickup device configured to pick up an optical image and generate a picked-up image; a display device including, in a finder loupe visual field, an image display region where a recorded image, which is a part of or a whole of the picked-up image, is drawn in a drawn region and an image display outside region other than the image display region; and a display controller configured to control the display device to draw, in the drawn region, a boundary display for making a boundary between the image display region and the image display outside region visually recognizable. The display controller controls the display device to change at least one of a color, luminance, and transmittance of the boundary display according to luminance of the image display region near a boundary with the image display outside region and controls the display device such that the luminance of the boundary display becomes higher than luminance of the image display outside region and the transmittance of the boundary display becomes higher as the luminance of the image display region near the boundary with the image display outside region increases.

An image display method for an image pickup apparatus according to an aspect of the present invention includes: drawing a recorded image, which is a part of or a whole of a picked-up image generated by picking up an optical image, in an image display region in a drawn region; displaying, in a finder loupe visual field, the image display region and an image display outside region other than the image display region; determining a difficulty degree of visibility of a boundary between the image display region and the image display outside region; drawing, when the difficulty degree is equal to or larger than a predetermined value, in the drawn region, a boundary display for making the boundary between the image display region and the image display outside region visually recognizable; and not drawing the boundary display when the difficulty degree is smaller than the predetermined value.

An image display method for an image pickup apparatus according to an aspect of the present invention includes: drawing a recorded image, which is a part of or a whole of a picked-up image generated by picking up an optical image, in an image display region in a drawn region; displaying, in a finder loupe visual field, the image display region and an image display outside region other than the image display region; drawing, in the drawn region, a boundary display for making a boundary between the image display region and the image display outside region visually recognizable; changing at least one of a color, luminance, and transmittance of the boundary display according to luminance of the image display region near a boundary with the image display outside region; and setting the luminance of the boundary display to be higher than luminance of the image display outside region and setting the transmittance of the boundary display to be higher as the luminance of the image display region near the boundary with the image display outside region increases.

A recording medium according to an aspect of the present invention is a computer-readable non-transitory recording medium that records a processing program, the processing program causes a computer to: draw a recorded image, which is a part of or a whole of a picked-up image generated by picking up an optical image, in an image display region in a drawn region; display, in a finder loupe visual field, the image display region and an image display outside region other than the image display region; determine a difficulty degree of visibility of a boundary between the image display region and the image display outside region; draw, when the difficulty degree is equal to or larger than a predetermined value, in the drawn region, a boundary display for making the boundary between the image display region and the image display outside region visually recognizable; and not draw the boundary display when the difficulty degree is smaller than the predetermined value.

A recording medium according to an aspect of the present invention is a computer-readable non-transitory recording medium that records a processing program, the processing program causes a computer to: draw a recorded image, which is a part of or a whole of a picked-up image generated by picking up an optical image, in an image display region in a drawn region; display, in a finder loupe visual field, the image display region and an image display outside region other than the image display region; draw, in the drawn region, a boundary display for making a boundary between the image display region and the image display outside region visually recognizable; change at least one of a color, luminance, and transmittance of the boundary display according to luminance of the image display region near a boundary with the image display outside region; and set the luminance of the boundary display to be higher than luminance of the image display outside region and set the transmittance of the boundary display to be higher as the luminance of the image display region near the boundary with the image display outside region increases.

DETAILED DESCRIPTION OF THE PREFERRED EMBODIMENT

Figure 1:
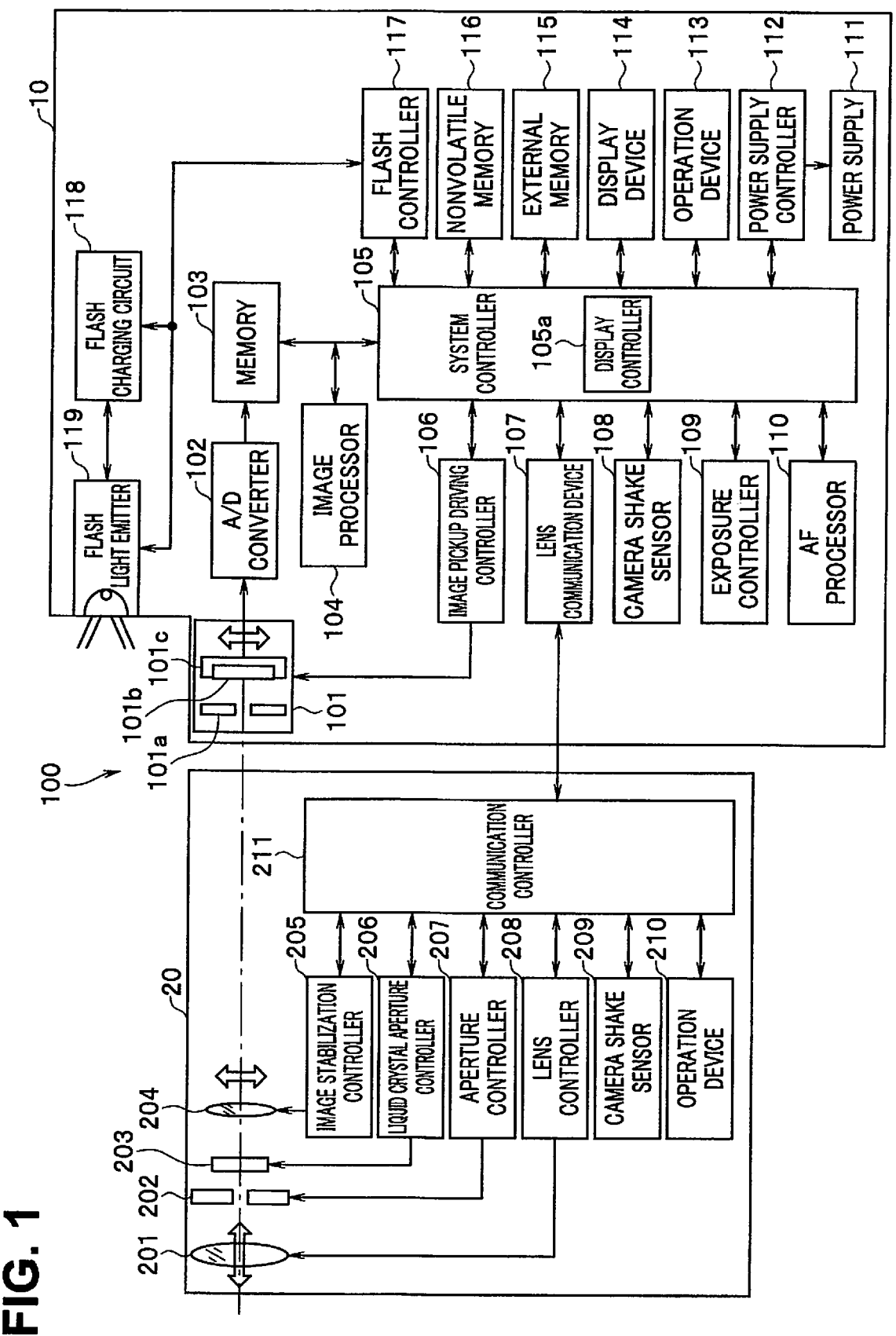
FIG. 1 is a diagram showing a configuration of an image pickup apparatus according to an embodiment of the present invention.

An embodiment of the present invention is explained below with reference to the drawings. However, the present invention is not limited by the embodiment explained below.

Note that, in description of the drawings, the same or corresponding elements are denoted by the same reference numerals and signs as appropriate. It needs to be noted that the drawings are schematic and relations among dimensions of respective elements, ratios of the respective elements, and the like in one drawing are sometimes different from real ones. Further, among a plurality of drawings, portions, relations and ratios of dimensions of which are different, are sometimes included.

FIG. 1 to FIG. 15 show an embodiment of the present invention. FIG. 1 is a diagram showing a configuration of an image pickup apparatus 100. In FIG. 1, a case in which the image pickup apparatus 100 is a single lens reflex digital camera is shown as an example. However, the present invention is not limited to the above example. The present invention can be widely applied to image pickup apparatuses in general that photograph object images, such as an electronic endoscope (which may be either a medical endoscope or an industrial endoscope or may be either a rigid endoscope or a flexible endoscope), a microscope with an image pickup function, a binocular with an image pickup function, and a telescope with an image pickup function.

As shown in FIG. 1, the image pickup apparatus 100 includes a camera main body 10 and a lens 20 that can be attached to and detached from the camera main body 10 using a lens mount or the like. Note that the image pickup apparatus 100 in which the lens 20 is detachable is explained herein. However, the image pickup apparatus 100 is not limited to the above and may be the image pickup apparatus 100 of a lens fixed type.

The lens 20 includes an image pickup optical system 201, an aperture mechanism 202, a liquid crystal aperture 203, and an image stabilization optical element 204.

The image pickup optical system 201 is an optical system for forming an optical image of an object. The image pickup optical system 201 may include an optical system for focus adjustment (a focus lens) and a zoom optical system (in the following explanation, the image pickup optical system 201 including both of the optical system for focus adjustment and the zoom optical system is explained as an example).

The aperture mechanism 202 includes a plurality of aperture vanes and the like and drives the aperture vanes to control size of an aperture opening to thereby mechanically adjust a passage amount of an object light beam.

The liquid crystal aperture 203 is an element that can change transmittance with electric control and electrically adjusts the passage amount of the object light beam.

The image stabilization optical element 204 moves in a direction perpendicular to an optical axis of the image pickup optical system 201 in order to cancel displacement of an optical image that occurs on an image pickup device 101b explained below because of camera shake of the image pickup apparatus 100.

The lens 20 includes an image stabilization controller 205, a liquid crystal aperture controller 206, an aperture controller 207, a lens controller 208, a camera shake sensor 209, an operation device 210, and a communication controller 211.

Configurations of respective blocks that perform control of the lens 20, that is, the image stabilization controller 205, the liquid crystal aperture controller 206, the aperture controller 207, the lens controller 208, and the communication controller 211 among these devices are realized by executing a processing program read from a storage device with an arithmetic circuit using various arithmetic circuits such as an ASIC (application specific integrated circuit) including a CPU (central processing unit) and an FPGA (field programmable gate array) and a storage device such as a memory. In other words, the processing program for realizing functions of the respective blocks with the arithmetic circuit is stored in advance in the storage device.

More specifically, the image stabilization controller 205 controls, according to a camera shake amount, movement of the image stabilization optical element 204 in the direction perpendicular to the optical axis of the image pickup optical system 201.

The liquid crystal aperture controller 206 controls the liquid crystal aperture 203 to change transmittance and adjusts the passage amount of the object light beam according to an instruction from the camera main body 10.

Similarly, the aperture controller 207 controls the aperture mechanism 202 to change the size of the aperture opening and adjusts the passage amount of the object light beam according to an instruction from the camera main body 10.

In still image photographing, the aperture mechanism 202 is used and the liquid crystal aperture 203 may be further used. However, since the aperture mechanism 202 sometimes emits noise sound, during moving image photographing for performing recording of sound as well, a light amount is adjusted using the liquid crystal aperture 203 that does not emit noise sound and is soundless.

The lens controller 208 moves, according to an instruction for zoom movement and focus adjustment from the camera main body 10, the zoom optical system and the optical system for focus adjustment included in the image pickup optical system 201.

The camera shake sensor 209 includes an acceleration sensor and an angular velocity sensor and detects an amount and a direction of camera shake that occurs in the lens 20.

Figure 2:
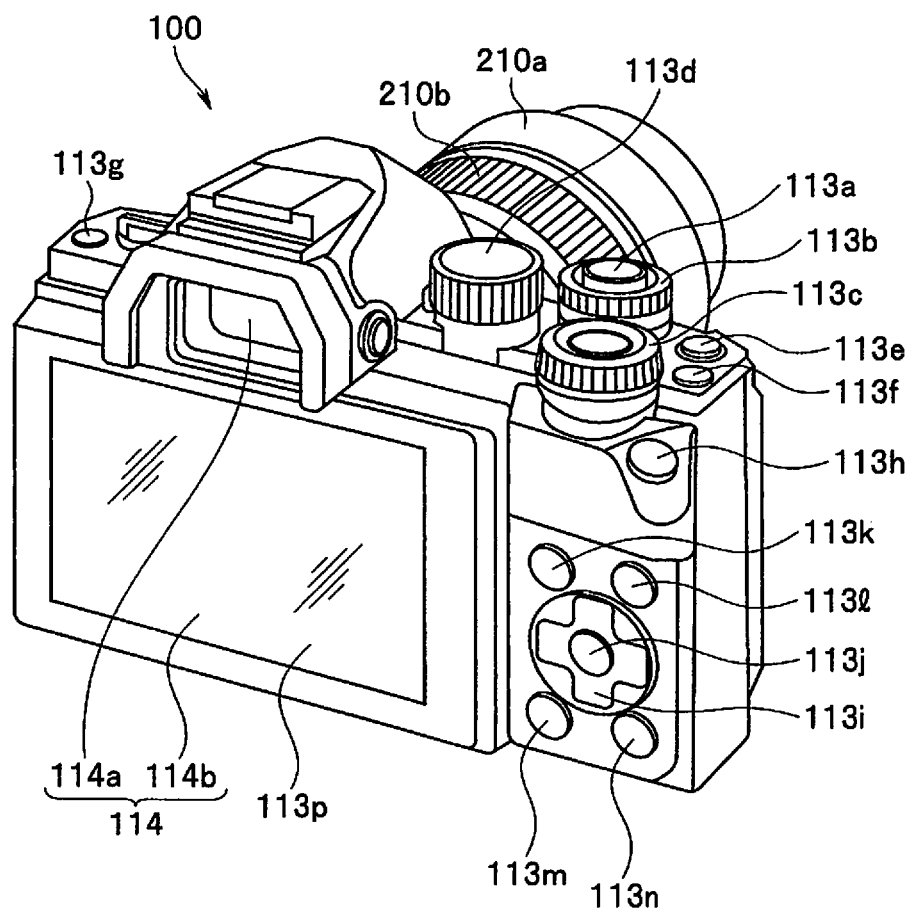
FIG. 2 is a perspective view showing, from a back side, an example of an exterior of the image pickup apparatus according to the embodiment.

The operation device 210 is an operation member provided in the lens 20 and includes a focus ring 210a and a zoom ring 210b shown in FIG. 2 and further includes, although not illustrated, an AF (auto focus) start button and an IS (image stabilize) start button.

The focus ring 210a is a rotary operation member for manually performing focus adjustment.

The zoom ring 210b is a rotary operation member for changing zoom.

An AF start button is an operation button for starting AF. The IS start button is an operation button for turning on and off IS.

The communication controller 211 controls the communication between the lens 20 and the camera main body 10. The communication controller 211 includes a storage device on the inside and stores various kinds of lens information and various kinds of control information.

The camera main body 10 includes a system controller 105, an image pickup unit 101, an A/D converter 102, a memory 103, an image processor 104, an image pickup driving controller 106, a lens communication device 107, a camera shake sensor 108, an exposure controller 109, an AF processor 110, a power supply 111, a power supply controller 112, an operation device 113, a display device 114, an external memory 115, a nonvolatile memory 116, a flash controller 117, a flash charging circuit 118, and a flash light emitter 119.

Configurations of respective blocks that perform control of the camera main body 10, that is, the system controller 105, the image pickup driving controller 106, the exposure controller 109, the AF processor 110, the power supply controller 112, and the flash controller 117 are realized by executing, with an arithmetic circuit, a processing program read from the storage (more specifically, the nonvolatile memory 116) using various arithmetic circuits (processors including hardware) such as an ASIC including a CPU and an FPGA and a storage device such as a memory. In other words, the processing program for realizing the functions of the respective blocks with the arithmetic circuit is stored in advance in the storage device.

The system controller 105 controls the camera main body 10 and collectively controls the entire image pickup apparatus 100. The system controller 105 reads a predetermined processing program stored in the nonvolatile memory 116 and executes various sequences explained below. The system controller 105 includes a display controller 105a. The display controller 105a controls display of the display device 114.

The image pickup unit 101 includes a mechanical shutter 101a, an image pickup device 101b, and an image stabilization driving mechanism 101c.

When the lens 20 is attached to the camera main body 10, the mechanical shutter 101a and the image pickup device 101b are disposed on the optical axis of the image pickup optical system 201.

The mechanical shutter 101a is configured by a publicly-known lens shutter, focal plane shutter, or the like and performs opening and closing for an object light beam formed by the image pickup optical system 201 and adjusts an exposure time of the image pickup device 101b. Note that an example in which the adjustment of the exposure time is performed by the mechanical shutter 101a is explained herein. However, the adjustment of the exposure time is not limited to the above example and may be performed by an electronic shutter of the image pickup device 101b or may be performed by a combination (a so-called hybrid shutter) of the mechanical shutter 101a and the electronic shutter.

The image pickup device 101b picks up the optical image of the object formed by the image pickup optical system 201 and generates and outputs an image signal of a picked-up image. The image pickup device 101b is configured as a two-dimensional solid-state image pickup sensor such as a CMOS (Complementary Metal Oxide Semiconductor) image sensor or a CCD (Charge Coupled Device) image sensor. The image pickup device 101b includes a two-dimensionally arrayed plurality of photoelectric conversion elements such as photodiodes. For example, color filters having a plurality of colors in a Bayer array are disposed on a front surface of array of the plurality of photoelectric conversion elements to respectively correspond to the plurality of photoelectric conversion elements. A photographing region of the image pickup device 101b is configured by a pixel group configured from the respective color filters and the respective photoelectric conversion elements. The image pickup device 101b converts, with the photoelectric conversion elements, light condensed by the image pickup optical system 201 and passed through the color filters into a photocurrent, accumulates the photocurrent in a capacitor, and outputs the photocurrent to the A/D converter 102 as an analog voltage signal (image signal).

The image stabilization driving mechanism 101c holds the image pickup device 101b to be able to move in the direction perpendicular to the optical axis of the image pickup optical system 201. The image stabilization driving mechanism 101c moves the image pickup device 101b to cancel displacement of an optical image generated on the image pickup device 101b by camera shake of the image pickup apparatus 100 and corrects the camera shake. The image stabilization driving mechanism 101c is also used to perform pixel shift for synthesizing a high-resolution image as explained below.

The A/D converter 102 A/D-converts the analog image signal outputted from the image pickup device 101b and outputs the analog image signal as digital image data.

The memory 103 is configured using a frame memory such as a VRAM (video random access memory) or a DRAM (dynamic random access memory) or a buffer memory. The memory 103 temporarily stores the image data outputted from the A/D converter 102 and temporarily stores various data such as image data to be processed by the image processor 104.

The image processor 104 is configured using a GPU (graphics processing unit), an FPGA (field programmable gate array), or the like. The image processor 104 reads out the image data temporarily stored in the memory 103 and performs image processing such as white balance correction processing, synchronization processing, and color conversion processing on the image data. Further, the image processor 104 performs, on the image data, compression processing for recording the image data in the external memory 115 and performs expansion processing for the compressed image data read out from the external memory 115.

The image pickup driving controller 106 performs various kinds of operation control and driving control for the image pickup unit 101. More specifically, although illustration of an internal configuration is omitted, the image pickup driving controller 106 includes a pixel shift driver, an image stabilization controller, an image pickup controller, and a shutter controller.

The pixel shift driver controls the image stabilization driving mechanism 101c and performs pixel shift for shifting a positional relation between the optical image of the object and the image pickup device 101b in a unit (for example, a 0.5 pixel pitch or a 1 pixel pitch) equal to or smaller than a pixel pitch.

The image stabilization controller controls the image stabilization driving mechanism 101c according to detection results by the camera shake sensor 209 and the camera shake sensor 108 and performs image stabilization such that the positional relation between the optical image of the object and the image pickup device 101b is kept constant.

The image pickup controller sets an operation mode of the image pickup device 101b, supplies electric power, a clock signal, a control signal, and the like to the image pickup device 101b, and causes the image pickup device 101b to perform exposure, and controls the image pickup device 101b to output an image signal after the exposure.

The shutter controller controls the mechanical shutter 101a and causes the mechanical shutter 101a to perform operation for opening and closing the mechanical shutter 101a during still image photographing, moving image photographing, and live view display, and the like.

The lens communication device 107 communicates with the communication controller 211 of the lens 20 through a lens mount pin provided in the lens mount and controls data communication between the camera main body 10 and the lens 20.

The camera shake sensor 108 includes an acceleration sensor and an angular velocity sensor and detects an amount and a direction of camera shake that occurs in the camera main body 10.

The exposure controller 109 calculates object luminance using the image data temporarily stored in the memory 103. Note that it goes without saying that the exposure controller 109 may be configured to calculate object luminance using a dedicated photometric sensor.

The AF processor 110 extracts a high-frequency component from the image data temporarily stored in the memory 103 and detects a focusing position where a contrast value calculated from the extracted high-frequency component takes a peak value. When the image pickup device 101b includes a pixel for phase difference detection, the AF processor 110 may perform range finding operation and calculate the focusing position based on a pixel signal of the pixel for phase difference detection or may use phase difference AF and contrast AF together.

The power supply 111 is configured by, for example, a battery, preferably, a secondary battery or the like that can be repeatedly used by being charged.

The power supply controller 112 performs control for converting electric power supplied from the power supply 111 into electric power having a predetermined voltage and supplies the electric power after the conversion to the respective sections in the image pickup apparatus 100. Further, the power supply controller 112 detects a voltage and remaining power of the battery configuring the power supply 111 and outputs a detection result to the system controller 105.

The operation device 113 is an operation member for inputting an instruction of a photographer. FIG. 2 is a perspective view showing, from a back side, an example of an exterior of the image pickup apparatus.

The operation device 113 includes, as shown in FIG. 2, a release button 113a, a front dial 113b, a rear dial 113c, a mode dial 113d, a digital teleconverter button 113e, an IS button 113f, a quick button 113g, a rim line display button 113h, a selection button 113i, a determination button 113j, an information button 113k, a drive button 113l, a menu button 113m, a reproduction button 113n, and a touch panel 113p.

The release button 113a includes a two-stage switch including a 1st (first) release switch and a 2nd (second) release switch. When the release button 113a is half-pressed, the 1st release switch is turned on. When the release button 113a is further pressed in from the half-press and is full-pressed, the 2nd release switch is turned on. When the 1st release switch is turned on, the system controller 105 executes a photographing preparation sequence such as AE (auto exposure) processing and AF processing. When the 2nd release switch is turned on, the system controller 105 executes photographing sequence for a still image and performs photographing.

The front dial 113b is a rotary operation member disposed on a front side of an upper part of the camera main body 10 and generates, according to rotation operation, an instruction signal for changing photographing parameters set as photographing conditions.

The rear dial 113c is a rotary operation member disposed on a rear side of the upper part of the camera main body 10 and generates, according to rotation operation, an instruction signal for changing photographing parameters set as photographing conditions.

The mode dial 113*d* is a rotary operation member and generates, according to rotation operation, an instruction signal for switching a photographing mode of the image pickup apparatus 100. As the photographing mode, there are a program photographing mode, an aperture priority photographing mode, a shutter speed priority photographing mode, a manual photographing mode, a full auto mode in which an optimum photographing mode is automatically selected, a scene mode for selecting a scene according to an object, and a moving image photographing mode. Note that the photographing mode is not limited to these photographing modes. Other photographing modes may be able to be set.

The digital teleconverter button 113*e* generates, according to pressing operation, an instruction signal for switching whether to enable or disable a digital teleconverter.

The IS button 113*f* generates, according to pressing operation, an instruction signal for switching whether to enable or disable an image stabilization mode.

The quick button 113*g* generates an instruction signal for starting SCP (super control panel) processing. The SCP processing is a processing for displaying photographing functions as a list on the display device 114. For example, ISO sensitivity, a white balance, a picture mode (finish), a flash, a flash correction value, image stabilization, drive (continuous photographing, self-timer, or the like), an AF scheme, contrast, and the like are collectively set on the SCP.

The rim line display button 113*h* generates, according to pressing operation, an instruction signal for switching a rim line display mode explained below.

The selection button 113*i* is used when selection of an item or a condition is performed on a menu screen or the like displayed on the display device 114. The selection button 113*i* is configured from four buttons, that is, an upper button, a lower button, a right button, and a left button.

The determination button 113*j* generates, according to pressing operation, an instruction signal for deciding the condition selected by the selection button 113*i*.

The information button 113*k* generates an instruction signal for causing the display device 114 to display various kinds of information concerning the image pickup apparatus 100.

The drive button 113*l* generates, according to pressing operation, an instruction signal for switching a photographing condition such as single photographing, continuous photographing, or the like.

The menu button 113*m* generates, according to pressing operation, an instruction signal for starting menu processing. A menu of the image pickup apparatus 100 is displayed on the display device 114 according to the instruction signal.

The reproduction button 113*n* generates, according to pressing operation, an instruction signal for executing image reproduction processing. An image is reproduced on the display device 114 according to the instruction signal.

The touch panel 113*p* is provided to be superimposed on a display region of a back display panel 114*b* of the display device 114 and generates an instruction signal corresponding to a position touched by an external object.

The display device 114 is configured using a display element such as a liquid crystal display or an organic EL (electro-luminescence) display, performs live view display and reproduction display of a recorded image recorded in the external memory 115, and further performs display of an exposure control value and the like and display of a menu screen for setting the photographing mode and the like. The display device 114 includes, as shown in FIG. 2, an electronic viewfinder (EVF) 114*a* and the back display panel 114*b*.

The electronic viewfinder 114*a* is configured to enlarge and observe, using a loupe such as an eyepiece lens, an image, information, and the like displayed on a display element disposed on an inside of the electronic viewfinder 114*a*. A visual field seen from the electronic viewfinder 114*a* is hereinafter referred to as finder loupe visual field 30 (see FIG. 3 and FIG. 4).

The back display panel 114*b* is disposed on a backside of the camera main body 10 (an opposite side of the lens 20) and configured to be observed at a certain degree of a distance away from the camera main body 10.

The external memory 115 is a recording medium detachably attachable to the camera main body 10 such as a memory card. Image data compressed by the image processor 104, sound data, and data incidental to the image data and the sound data are recorded in the external memory 115. The sound data is recorded in the external memory 115 as moving image sound in synchronization with the recorded image. Note that the recording medium for recording the image data, the sound data, and the like is not limited to the external memory 115 and may be a recording medium such as a hard disk incorporated in the camera main body 10.

The nonvolatile memory 116 is a memory electrically rewritable, stored content of which is held in a nonvolatile manner. The nonvolatile memory 116 stores a processing program to be executed by the system controller 105 and various parameters and the like necessary for operation of the image pickup apparatus 100.

The flash light emitter 119 includes a light emitting tube such as a Xeon tube and a reflection umbrella for reflecting light emitted by the light emitting tube toward the object. The flash light emitter 119 receives a light emission instruction signal transmitted from the flash controller 117 and emits light using electric energy accumulated in a capacitor of the flash charging circuit 118.

The flash charging circuit 118 is a circuit that accumulates electric energy necessary for the flash light emitter 119 to preform light emission. The flash charging circuit 118 includes a booster circuit that boosts a voltage of electric power supplied from the power supply 111 and a capacitor that accumulates electric energy at the boosted voltage.

The flash controller 117 controls a charging operation of the flash charging circuit 118 and flash light emission of the flash light emitter 119.

The system controller 105 is connected to the memory 103, the image processor 104, the image pickup driving controller 106, the lens communication device 107, the camera shake sensor 108, the exposure controller 109, the AF processor 110, the power supply controller 112, the operation device 113, the display device 114, the external memory 115, the nonvolatile memory 116, the flash controller 117, and the like. When the photographer operates any operation member of the operation device 113, the system controller 105 executes various sequences corresponding to the operation by the photographer.

Figure 3:
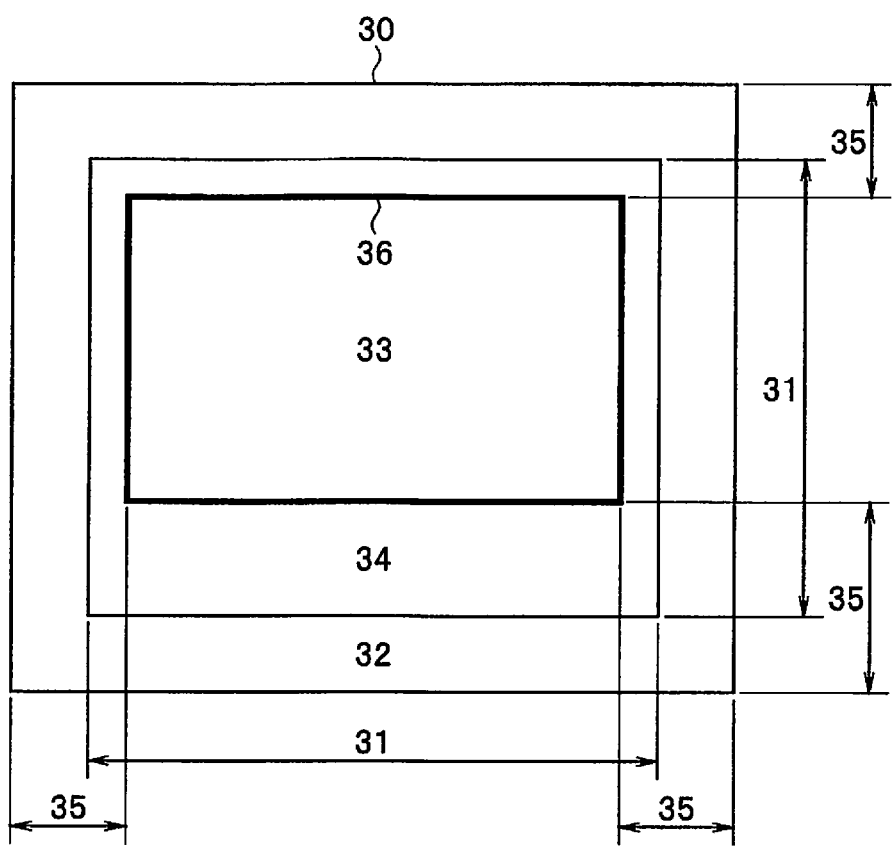
FIG. 3 is a diagram for explaining respective regions in a finder loupe visual field of an electronic viewfinder in the embodiment.

Next, FIG. 3 is a diagram for explaining respective regions in the finder loupe visual field 30 of the electronic viewfinder 114*a*.

Figure 4:
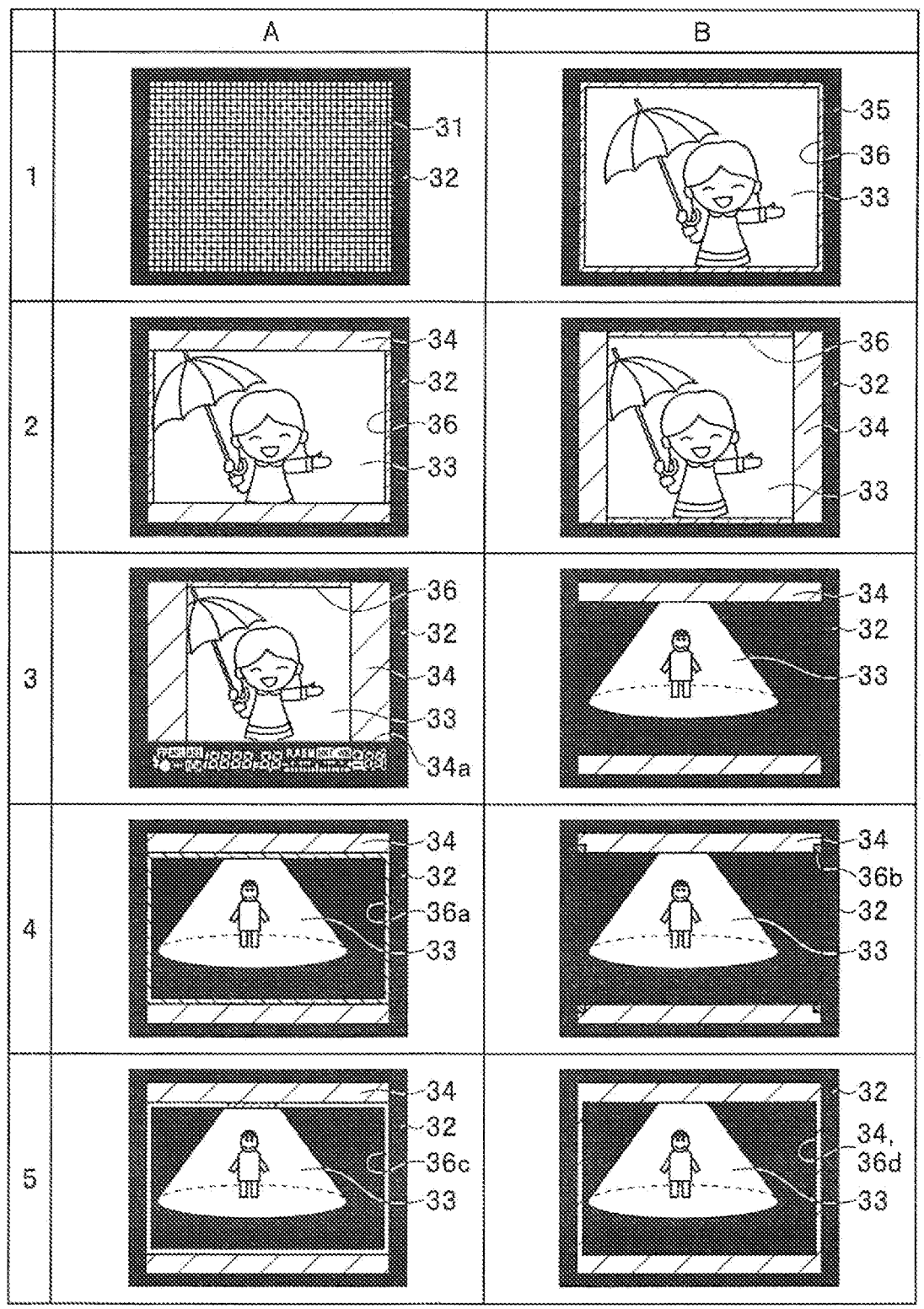
FIG. 4 is a diagram showing respective display examples in the finder loupe visual field in the embodiment.

An entire region where display pixels are arrayed and an image can be drawn is referred to as drawn region 31 (see a 1A field in FIG. 4 as well). In order to set finder magnification as high as possible, it is preferable that an entire image can be displayed in the entire drawn region 31. Accordingly, the drawn region 31 is configured in a rectangular shape having the same aspect ratio as an aspect ratio of a rectangular photographing region configured by the pixel group of the image pickup device 101b.

A region other than the drawn region 31 in the finder loupe visual field 30 is referred to as non-drawn region 32. More specifically, the non-drawn region 32 is a region configured by a light blocking mask of the display element of the electronic viewfinder 114a, which is the display device 114, or a region where the display pixels are absent.

An image display region 33 is a region where, in the drawn region 31, a recorded image (the "recorded image" displayed in the image display region 33 also includes an image indicating a range set as a recording target displayed during live view), which is a part of or a whole of a picked-up image, is drawn and displayed. The image display region 33 is formed in a rectangular shape according to the recorded image formed in a rectangular shape.

An image non-display region 34 is a region other than the image display region 33 (a region surrounding the image display region 33) in the drawn region 31. The image non-display region 34 is set to relatively low luminance not to disturb concentration of the photographer who observes the image display region 33 (see FIG. 4 and the like).

An image display outside region 35 is a region other than the image display region 33 in the finder loupe visual field 30. Therefore, the image display outside region 35 is a region where the recorded image is not displayed and includes the image non-display region 34 and the non-drawn region 32 explained above.

Note that, although not shown in FIG. 3, an aspect limited display region (see FIG. 4 and the like) is the image non-display region 34 at the time when an aspect ratio of the image display region 33 is limited by an aspect. For example, when the non-drawn region 32 is absent, the image display outside region 35 is configured by, for example, the image non-display region 34 functioning as the aspect limited display region in the drawn region 31.

Display for making a boundary between the image display region 33 and the image display outside region 35 visually recognizable is a boundary display 36 explained below. The boundary display 36 is displayed by the display controller 105a controlling the display device 114 to perform drawing in the drawn region 31. Note that, basically, the boundary display 36 is displayed on the electronic viewfinder 114a. However, the boundary display 36 may be displayed or may not be displayed on the back display panel 114b.

Subsequently, FIG. 4 is a diagram showing respective display examples in the finder loupe visual field 30.

A 1A field shows a configuration of the finder loupe visual field 30 at the time when an image or the like is not displayed. A portion (a mesh-like portion) in which display pixels are arrayed is the drawn region 31. A black frame portion on an outer side of the drawn region 31 is the non-drawn region 32.

Respective fields of 1B, 2A, 2B, and 3A show configurations of the finder loupe visual field 30 at the time when a relatively bright image is displayed.

An aspect ratio of a recorded image shown in the 1B field is the same as an aspect ratio of the drawn region 31. Accordingly, the image non-display region 34 is absent in the drawn region 31. The image display outside region 35 is, for example, only the non-drawn region 32 configured by the light blocking mask. In this case, four sides of the recorded image are respectively in contact with four sides of the drawn region 31. The boundary display 36 indicating the boundary between the image display region 33 and the image display outside region 35 is drawn on the four sides of the drawn region 31.

An aspect ratio of a recorded image shown in the 2A field is a laterally longer ratio in comparison with the aspect ratio of the drawn region 31. At this time, in order to set finder magnification as high as possible, the recorded image is adjusted in size and displayed such that left and right sides of the image display region 33 are in contact with left and right sides of the drawn region 31. On the other hand, the image non-display region 34 due to a difference between the aspect ratios is drawn as the aspect limited display region above and below the image display region 33 in the drawn region 31. The boundary display 36 is drawn on left and right two sides where the image display region 33 and the non-drawn region 32 are in contact. On the other hand, a boundary between the image display region 33 and the image non-display region 34 is easily distinguished on upper and lower two sides where the image display region 33 and the image non-display region 34 are in contact. Therefore, the boundary display 36 is not drawn.

An aspect ratio of a recorded image shown in the 2B field is a longitudinally longer ratio in comparison with the aspect ratio of the drawn region 31. At this time, in order to set the finder magnification as high as possible, the recorded image is adjusted in size and displayed such that upper and lower sides of the image display region 33 are in contact with upper and lower sides of the drawn region 31. On the other hand, the image non-display region 34 due to a difference between the aspect ratios is drawn as the aspect limited display region on the left and right of the image display region 33 in the drawn region 31. The boundary display 36 is drawn on upper and lower two sides where the image display region 33 and the non-drawn region 32 are in contact. The boundary display 36 is not drawn on left and right two sides where the image display region 33 and the image non-display region 34 are in contact.

In an example shown in the 3A field, an aspect ratio of a recorded image is substantially the same as the aspect ratio in the 2B field. In the example, the image display region 33 is set smaller than the image display region 33 in the 2B field, the image non-display region 34 is also provided on a lower side of the image display region 33, and an information display region 34a is provided in the image non-display region 34 on the lower side. For example, characters including numbers, icons, or an indicator with a scale are displayed in the information display region 34a. Even in this case, in order to set the finder magnification as high as possible, the recorded image is adjusted in size and displayed such that an upper side of the image display region 33 is in contact with an upper side of the drawn region 31. The boundary display 36 is drawn on the upper side where the image display region 33 and the non-drawn region 32 are in contact. The boundary display 36 is not drawn on left, right, and lower three sides where the image display region 33 and the image non-display region 34 are in contact.

As shown in the respective fields of 1B, 2A, 2B, and 3A, in order to set the finder magnification as high as possible, at least one side among the four sides of the recorded image is drawn to be in contact with any one of the four sides of the drawn region 31.

Respective fields of 3B, 4A, 4B, 5A, and 5B show configurations of the finder loupe visual field 30 at the time when an image with a spotlight and a dark background is displayed. In recorded images shown in the respective fields of 3B, 4A, 4B, 5A, and 5B, a background other than a portion lighted by the spotlight is dark. Therefore, it is difficult to distinguish a boundary between the image display outside region 35 including the image non-display region 34 and the non-drawn region 32 and the image display region 33.

As with the 2A field, an aspect ratio of the recorded image shown in the 3B field is a laterally longer ratio in comparison with the aspect ratio of the drawn region 31. The image non-display region 34 is drawn as the aspect limited display region only above and below the image display region 33 in the drawn region 31. For a photographing target shown in the 3B field, the boundary display 36 shown in the respective fields of 4A, 4B, 5A, and 5B is effective for distinguishing the boundary between the image display region 33 and the image display outside region 35. The boundary display 36 is display for making it possible to distinguish the boundary between the image display region 33 and the image display outside region 35 by differentiating a color, luminance, and the like from an inscribed side of the image display outside region 35 and a circumscribed side of the image display region 33.

The boundary display 36 shown in the 4A field is a rectangular boundary line 36a. Left and right sides of the boundary line 36a are drawn to be superimposed on the image display region 33. However, upper and lower sides of the boundary line 36a are drawn to be superimposed on the image non-display region 34. When the image non-display region 34 is present in this way, it is preferable to secure a finder visual field ratio as close to 100% as possible by displaying the boundary display 36 in the image non-display region 34. Note that transmittance larger than 0 explained below is set in the boundary line 36a drawn to be superimposed on the image non-display region 34 to allow an image under the boundary line 36a to be transmitted and seen and secure the finder visual field ratio of 100%.

The boundary display 36 shown in the 4B field is four corner displays 36b. The corner displays 36b are formed in, for example, a dot-like shape (an appropriate shape such as a square dot or a circle dot can be adopted) and are drawn to be superimposed on the image non-display region 34 that is in contact with four corners of the image display region 33. Consequently, the finder visual field ratio of 100% is secured.

The boundary display 36 shown in the 5A field is a rectangular reversed display boundary line 36c. The reversed display is display in a so-called negative-positive relation in which, when a pixel value of the reversed display is added up with a pixel value of an original image, a gray scale is formed. The reversed display boundary line 36c is drawn on the image display region 33. However, in the reversed display, an image can be confirmed even in a reversed state. Accordingly, the finder visual field ratio of 100% is secured when the reversed display is included. Note that, for example, an exposure correction boundary line may be used instead of the reversed display boundary line 36c. The exposure correction boundary line is a line on which exposure of an original image is corrected by, for example, approximately +0.5 stage in a region of thickness of a boundary line.

In the boundary display 36 shown in the 5B field, the image non-display region 34 in contact with all the four sides of the image display region 33 is provided such that the image non-display region 34 functions as a boundary display frame 36d as well. Not to disturb concentration of the photographer, the boundary display frame 36d is set to be a gray scale having relatively low luminance within a luminance range in which the inscribed side of the non-drawn region 32 and the circumscribed side of the image display region 33 can be distinguished and visually recognized.

Figure 5:
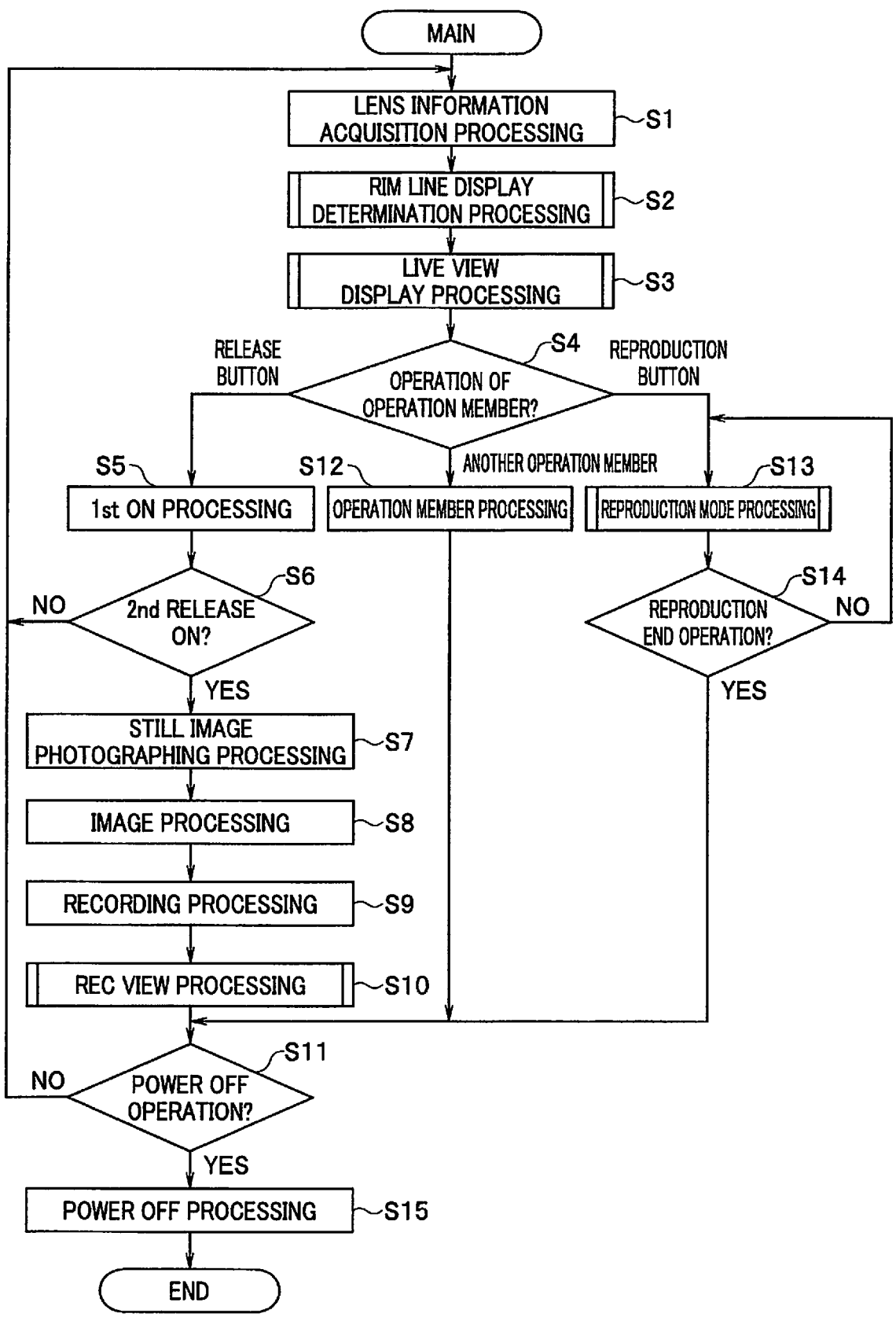
FIG. 5 is a flowchart showing main processing in the image pickup apparatus in the embodiment.

FIG. 5 is a flowchart showing main processing in the image pickup apparatus 100. The main processing and processing of respective subroutines are performed by the system controller 105 controlling the image pickup apparatus 100 according to a processing program.

When, for example, a power supply of the image pickup apparatus 100 is turned on and this processing is started, the system controller 105 performs predetermined initialization processing, performs communication with the communication controller 211 of the lens 20, and acquires lens information (step S1). The lens information acquired here is, for example, a lens type, a lens serial number, a lens F value from a minimum F value to a maximum F value, a shortest photographing distance, a nominal focal distance, a lens color temperature, and a lens extension pulse amount from infinity to a closest distance.

Subsequently, the display controller 105a performs rim line display determination processing (step S2). Note that, in the following explanation, a rim line (a boundary line), which is one of representative examples of the boundary display 36, is affixed to a processing name, a flag name, and the like. However, as explained above, the boundary display 36 is not limited to the rim line.

In this rim line display determination processing, the display controller 105a determines whether the boundary display 36 is necessary for a recorded image displayed in the image display region 33 and sets a rim line display determination flag according to a determination result. More specifically, when determining that the boundary display 36 is necessary, the display controller 105a sets the rim line display determination flag to 1. When determining that the boundary display 36 is unnecessary, the display controller 105a sets the rim line display determination flag to 0.

Subsequently, the display controller 105a performs live view display processing (step S3). In the live view display processing, the display controller 105a performs live view display conforming to setting of an aspect ratio, setting of a digital teleconverter, and the like. Therefore, when the digital teleconverter is not set and the aspect ratio is normal, the live view display is normal live view display on which trimming and the like are not performed.

In this live view display processing, the display controller 105a further controls, based on the rim line display determination flag explained above, a rim line display flag set in the menu, a rim line type flag set in the menu, and a rim line display form set in the menu, the display device 114 to draw the boundary display 36 on the live view display.

The rim line display flag is a flag indicating a rim line display mode and is set by, for example, operating the selection button 113i and the determination button 113j on the menu displayed on the display device 114. As the rim line display flag, for example, three kinds of 0 to 2 can be set. "0" is a flag indicating a display off mode (OFF) for not displaying the boundary display 36, "1" is a flag indicating an automatic display mode (ON1) in which the system controller 105 determines based on the rim line display determination flag explained above whether the boundary display 36 is necessary and, when the system controller 105 determines that the boundary display 36 is necessary, the boundary display 36 is automatically displayed, and "2" is a flag indicating a forced display mode (ON2) for always displaying the boundary display 36. The boundary between the image display region 33 and the image non-display region 34 can be sometimes visually recognized even if the boundary display 36 is absent. Setting the ON1, which does not disturb concentration of the photographer when the boundary display 36 is unnecessary, is preferable to setting the ON2.

As the rim line type flag, for example, three kinds from 1 to 3 can be set. "1" is a flag indicating the boundary line 36a (type 1) shown in the 4A field of FIG. 4, "2" is the corner display 36b (type 2) shown in the 4B field of FIGS. 4, and "3" is a flag showing the reversed display boundary line 36c (type 3) shown in the 5A field of FIG. 4.

Further, the rim line display form is a display form of the boundary display 36 based on setting values of a color, luminance, transmittance, and thickness. Concerning the boundary line 36a and the corner display 36b, a color and luminance (respective values (for example, 0 to 255) of R, G, and B), transmittance (0% to 100%), thickness (size in the case of the corner display 36b) (for example, 1 pt to 10 pt) can be set as desired by a menu. Concerning the reversed display boundary line 36c, thickness (for example, 1 pt to 10 pt) can be set as desired by the menu.

For example, in the case of the boundary line 36a, an expert in photographing tends to prefer a thin line having an achromatic color low luminance (close to black). On the other hand, a beginner tends to prefer a thick line having a white color and high luminance. A preference for the boundary line 36a is different according to a region in the world, darkness of a photographing environment, and the like. For example, in a European region and a dark photographing environment, colors ranging from dark red to orange tend to be preferred. In this way, tendency of preference for the display form of the boundary display 36 is various according to users. Since moderate setting suitable for all the users is absent, the display form of the boundary display 36 can be set by a menu.

Thereafter, the system controller 105 determines whether any one of the release button 113a, the reproduction button 113n, and another operation member is operated (step S4).

When determining that the release button 113a is operated and a first release switch is turned on, the system controller 105 performs first release on (1st on) processing (step S5). This first release on processing is the same as first release on processing of a general camera. The system controller 105 executes, for example, AF processing, AE processing, and the like to perform processing for setting various parameters concerning a photographing operation according to a photographing environment.

Subsequently, the system controller 105 determines whether a second (2nd) release switch of the release button 113a is turned on (step S6).

When determining that the second release switch is not turned on, the system controller 105 returns to step S1 and performs the processing explained above.

When determining in step S6 that the second release switch is turned on, the system controller 105 performs still image photographing processing and acquires image data of a recorded image, which is a part of or a whole of a picked-up image generated by picking up an optical image with the image pickup device 101b (step S7).

The image processor 104 performs various kinds of image processing and compression processing for recording on the acquired image data (step S8).

The image data processed by the image processor 104 is recorded in the external memory 115 as an image file (step S9). In the image file, incidental data of the image data is recorded as, for example, Exif (Exchangeable image file format) data. At this time, when a rim line is displayed when an image is photographed, the system controller 105 records a rim line display determination flag and a rim line display form set by the menu in Exif together with the image data.

Further, the system controller 105 performs rec view processing and displays the image data recorded in the external memory 115 on the display device 114 (step S10). In this rec view processing, the display controller 105a controls, based on the rim line display flag and the rim line type flag set by the menu and the rim line display determination flag and the rim line display form recorded in the Exif, at least the electronic viewfinder 114a of the display device 114 to draw the boundary display 36 on a rec view display image.

Figure 15:
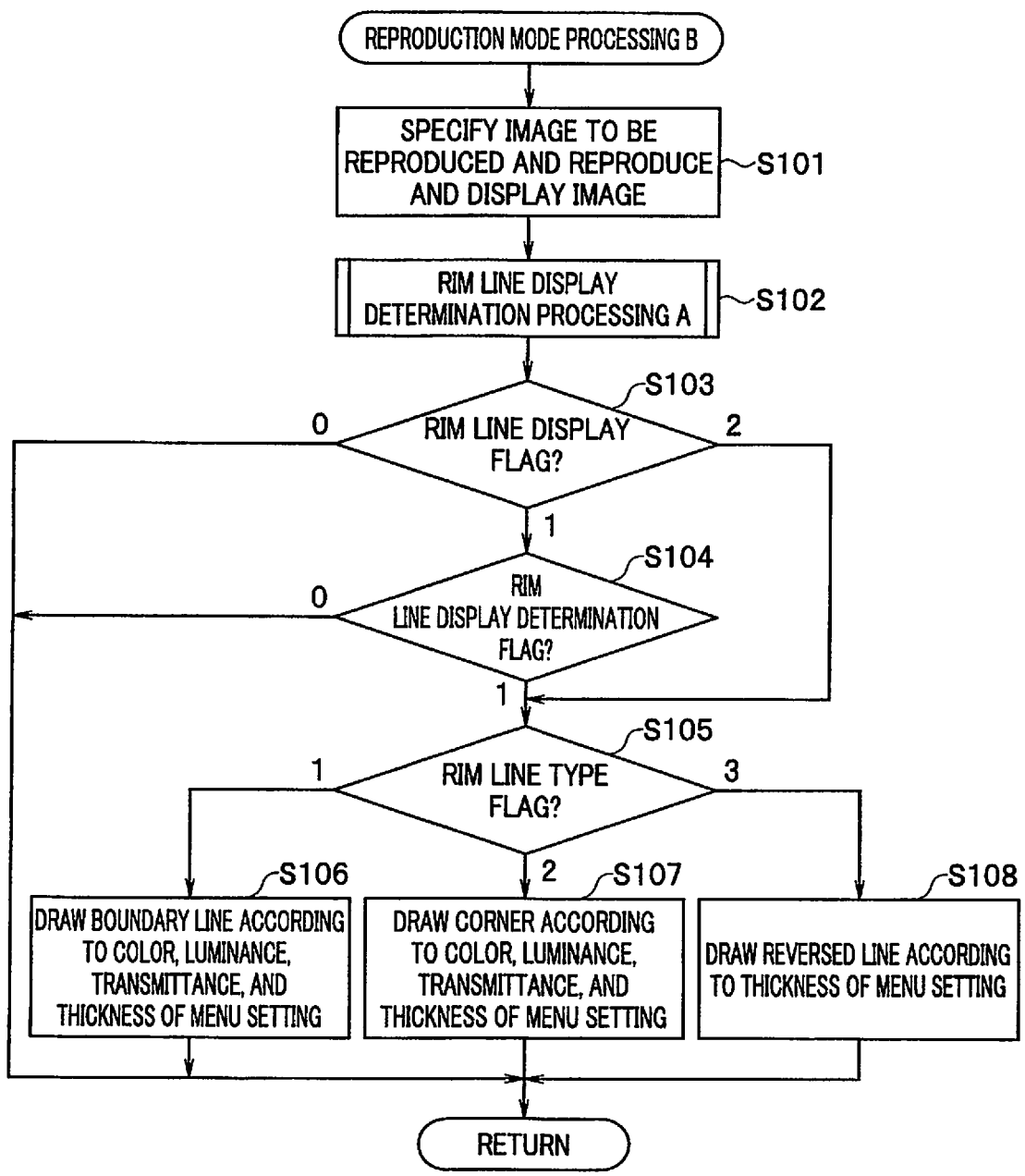
FIG. 15 is a flowchart showing reproduction mode processing B in the image pickup apparatus in the embodiment.

However, concerning the rim line display determination flag, instead of using the flag recorded in the Exif, a flag obtained by determining based on display image data of rec view whether the boundary display 36 is necessary may be used (see reproduction mode processing B in FIG. 15, which is the same processing as the rec view processing).

When ending the processing in step S10, the system controller 105 determines whether operation for turning off the power supply of the image pickup apparatus 100 is performed (step S11). When the operation is not performed, the system controller 105 returns to step S1 and performs the processing explained above.

When determining in step S4 that the other operation member, which is neither the release button 113a nor the reproduction button 113n, is operated, the system controller 105 performs processing corresponding to the operated operation member (step S12).

More specifically, when the menu button 113m is operated, the system controller 105 performs menu button processing for displaying a menu on the display device 114.

When the rim line display button 113h is operated, the system controller 105 performs rim line display button processing for changing the rim line display flag. When the rim line display flag is "1", every time the rim line display button 113h is pressed once, the system controller 105 changes the rim line display flag as "1"→"0"→"1"→"0"→ . . . . When the rim line display flag is "2", every time the rim line display button 113h is pressed once, the system controller 105 changes the rim line display flag as "2"→"0"→"2"→"0"→ . . . . When the rim line display flag is "0", every time the rim line display button 113h is pressed once, the system controller 105 changes the rim line display flag as "0"→"2"→"0"→"2"→ . . . .

When the focus ring 210a is operated, the system controller 105 performs focus ring processing for moving the focus lens according to a rotating direction and a rotation amount of the focus ring 210a.

When the zoom ring 210b is operated, the system controller 105 performs zoom ring processing for zooming the image pickup optical system 201 according to a rotating direction and a rotation amount of the zoom ring 210b.

Further, when an operation member other than the above is operated, the system controller 105 performs processing corresponding to the operation member.

After performing the processing in step S12, the system controller 105 proceeds to the processing in step S11.

When determining in step S4 that the reproduction button 113n is operated, the system controller 105 performs reproduction mode processing (step S13). In this reproduction mode processing, as in the rec view processing in step S10, the display controller 105a controls, based on the rim line display flag and the rim line type flag set by the menu and the rim line display determination flag and the rim line display form stored in the Exif, at least the electronic viewfinder 114a of the display device 114 to draw the boundary display 36 on a reproduced image.

However, concerning the rim line display determination flag, instead of using the flag recorded in the Exif, a flag obtained by determining based on reproduced image data whether the boundary display 36 is necessary may be used (see FIG. 15). Further, concerning the rim line display form, instead of using the rim line display form recorded in the Exif, a rim line display form set in the image pickup apparatus 100 at a point in time when image reproduction is performed may be used.

Subsequently, the system controller 105 determines whether operation for ending the reproduction is performed (step S14). The operation for ending the reproduction is performed by, for example, pressing of the reproduction button 113n, pressing of the release button 113a, pressing of the menu button 113m, or power-off operation. When determining that the operation for ending the reproduction is not performed yet, the system controller 105 continuously performs the processing in step S13. When determining that the operation for ending the reproduction is performed, the system controller 105 proceeds to the processing in step S11.

When determining in step S11 that the operation for turning off the power supply is performed, power-off processing is performed based on control of the system controller 105 (step S15). Here, the power-off processing is processing for returning the focus lens of the image pickup optical system 201 to an initial position, returning the image stabilization optical element 204 to an initial position, returning the image stabilization driving mechanism 101c to an initial position, turning off the display device 114, and the like. Thereafter, this processing is ended.

Figure 6:
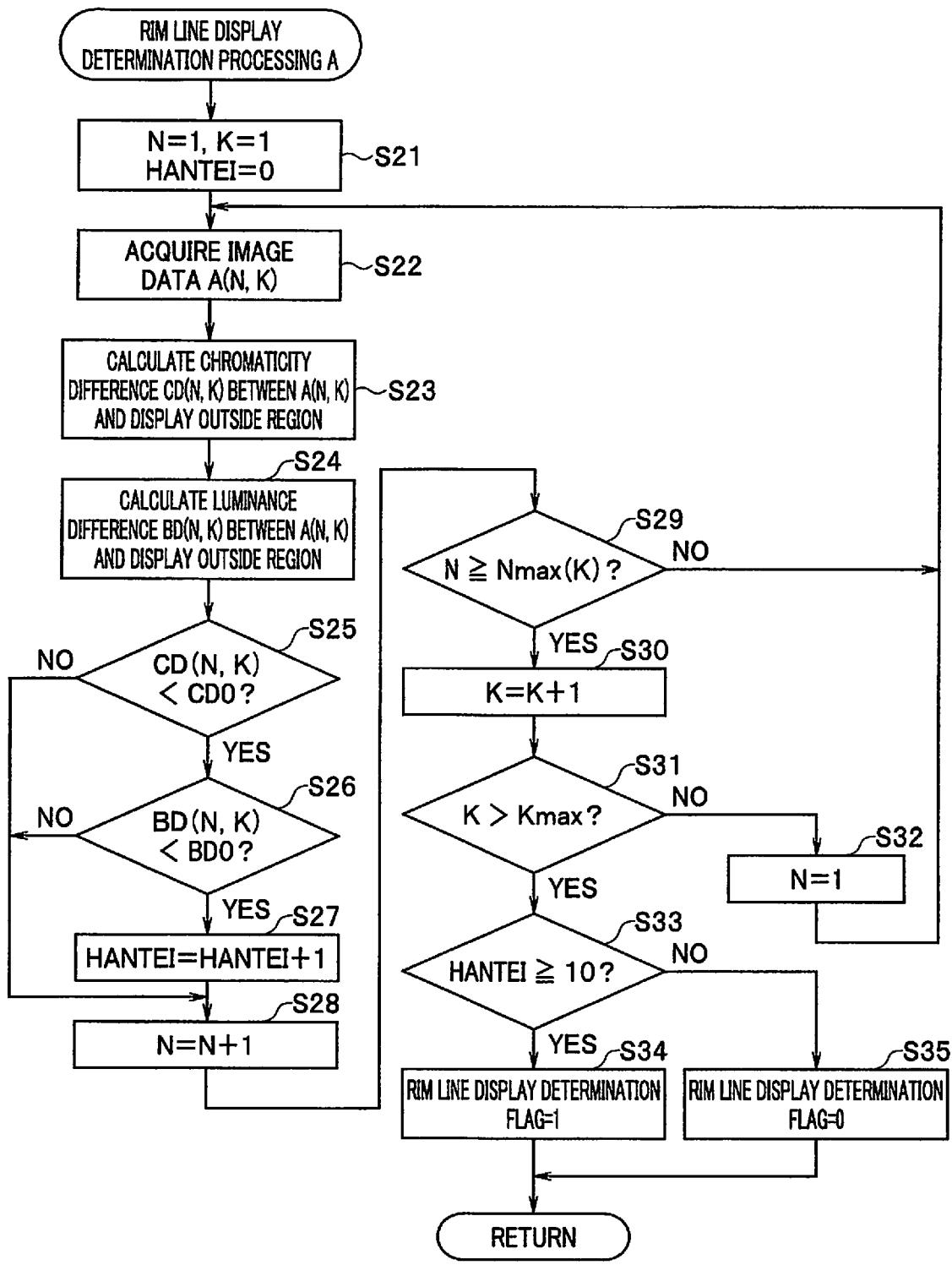
FIG. 6 is a flowchart showing rim line display determination processing A in the image pickup apparatus in the embodiment.
Figure 7:
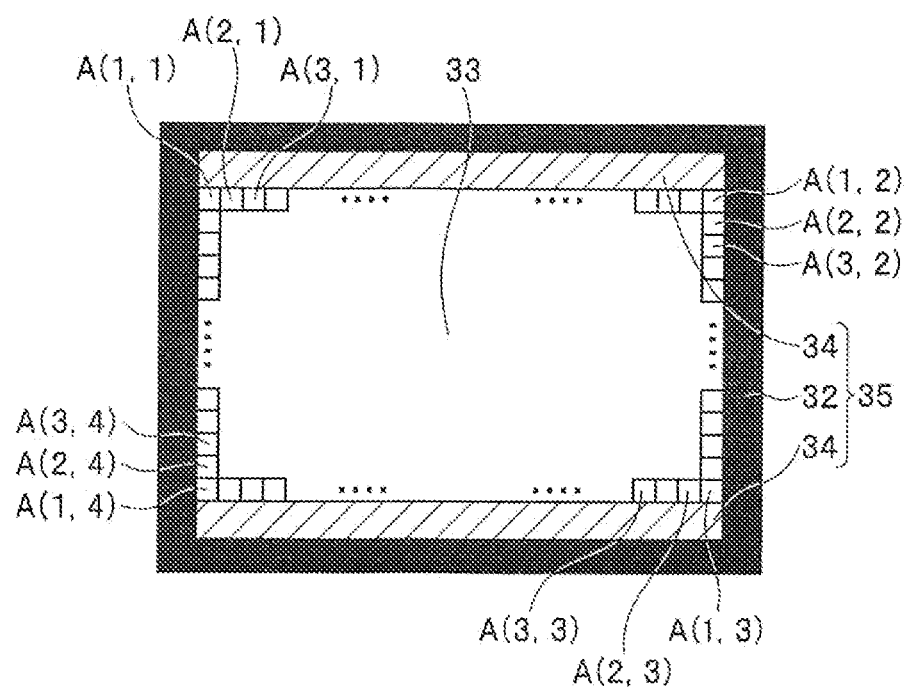
FIG. 7 is a diagram showing arrangement in an image display region of image data A (N, K) used in the rim line display determination processing A in the embodiment.

FIG. 6 is a flowchart showing rim line display determination processing A in the image pickup apparatus 100. FIG. 7 is a diagram showing arrangement in the image display region 33 of image data A(N, K) used in the rim line display determination processing A. Note that A, B, and the like attached after processing names indicate that the processing A may be performed as a subroutine or the processing B may be performed instead of the processing A.

When entering this processing in step S2 in FIG. 5 (or step S102 in FIG. 15 explained below), the system controller 105 performs initialization of parameters and sets a region number index N to 1, sets a side number index K to 1, and sets a determination number index HANTEI to 0 (step S21).

FIG. 7 shows arrangement of image data A(N, K) of a region indicated by an index set (N, K). As illustrated, the side number index K is set 1 for an upper side, 2 for a right side, 3 for a lower side, and 4 for a left side of the image display region 33. The region number index N is set in order from 1 clockwise for regions that are in contact with the image display outside region 35 in the side indicated by the side number index K.

The system controller 105 acquires the image data A(N, K) of the region indicated by the index set (N, K) (step S22).

The region indicated by the index set (N, K) may be a region configured by one pixel or may be a region configured by a plurality of pixels. In the case of the region configured by the plurality of pixels, as the image data A(N, K), an average (or a weighted average, or a median, or the like) of pixel values of the plurality of pixels only has to be used.

Note that, when a maximum region umber of a side indicated by the side number index K is represented as Nmax(K), for example, since a last region of an upper side and a first region of a right side are common, the image data A(N, K) is as follows:

$A(N\text{max}(1), 1) = A(1, 2)$ $A(N\text{max}(2), 2) = A(1, 3)$ $A(N\text{max}(3), 3) = A(1, 4)$ $A(N\text{max}(4), 4) = A(1, 1)$ Subsequently, the system controller 105 calculates a chromaticity difference CD(N, K) between the image data A(N, K) and the image display outside region 35 (step S23).

Further, the system controller 105 calculates a luminance difference BD(N, K) between the image data A(N, K) and the image display outside region 35 (step S24).

Thereafter, the system controller 105 determines whether CD(N, K) is smaller than a predetermined threshold CD0 (step S25). When determining that CD(N, K) is smaller than the predetermined threshold CD0, the system controller 105 further determines whether BD(N, K) is smaller than a predetermined threshold BD0 (step S26).

When determining in step S26 that BD(N, K) is smaller than the predetermined threshold BD0, the system controller 105 increments the determination number index HANTEI (step S27). Note that a sign "=" means that a value of a right side is substituted in a variable of a left side as widely used in a programming language (the same applies below as appropriate).

When performing the processing in step S27 or determining in step S25 or step S26 that CD(N, K) is equal to or larger than the threshold CD0 or BD(N, K) is equal to or larger than the threshold BD0, the system controller 105 increments N (step S28).

Subsequently, the system controller 105 determines whether the region number index N is equal to or larger than the maximum region number Nmax(K) (step S29). When determining that the region number index N is still smaller than the maximum region number Nmax(K), the system controller 105 returns to step S22 and performs the processing explained above.

On the other hand, when determining in step S29 that the region number index N is equal to or larger than the maximum region number Nmax(K), the system controller 105 increments the side number index K (step S30) and determines whether the side number index K is larger than a number Kmax of sides of the image display region 33 (when the image display region 33 is formed in a rectangular shape, Kmax=4) (step S31).

When determining that the side number index K is still equal to or smaller than the number Kmax, the system controller 105 resets the region number index to N=1 (step S32) and then returns to step S22 and performs the processing explained above.

When determining in step S31 that the side number index K is larger than Kmax, the system controller 105 determines whether the determination number index HANTEI is equal to or larger than a predetermined threshold, for example, 10 (step S33). Note that 10 is described as an example of the predetermined threshold. However, the predetermined threshold is not limited to the above example. It goes without saying that an appropriate value should be set according to the numbers of regions present in the respective sides of the image display region 33, preference of a user, and the like.

When determining in step S33 that the determination number index HANTEI is equal to or larger than 10, the system controller 105 sets 1 in the rim line display determination flag (step S34). When determining in step S33 that the determination number index HANTEI is smaller than 10, the system controller 105 sets 0 in the rim line display determination flag (step S35). The system controller 105 returns from this processing.

In this way, the display controller 105a determines a difficulty degree of visibility of the boundary between the image display region 33 and the image display outside region 35 (a value of the determination number index HANTEI). The display controller 105a controls the display device 114 to draw the boundary display 36 when the difficulty degree is equal to or larger than a predetermined value and not to draw the boundary display 36 when the difficulty degree is smaller than the predetermined value.

Figure 8:
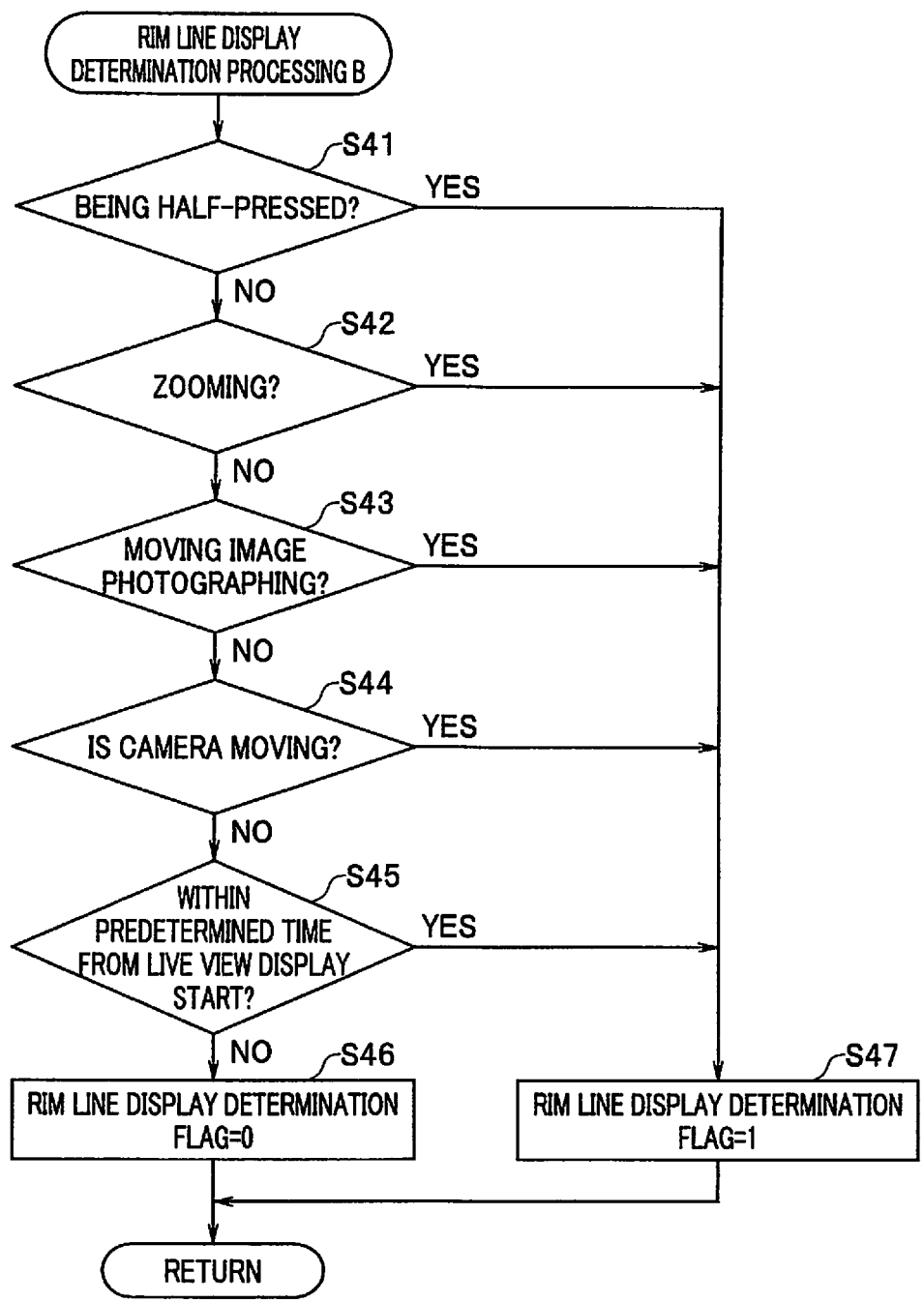
FIG. 8 is a flowchart showing rim line display determination processing B in the image pickup apparatus in the embodiment.

FIG. 8 is a flowchart showing rim line display determination processing B in the image pickup apparatus 100.

In the rim line display determination processing A explained above, when the number of regions where the chromaticity difference between the image display region 33 and the image display outside region 35 is small and the luminance difference between the image display region 33 and the image display outside region 35 is small is equal to or larger than the predetermined number, the system controller 105 determines that it is necessary to display the boundary display 36 and sets the rim line display determination flag to 1. On the other hand, in the rim line display determination processing B, in a photographing situation in which the user is assumed to be performing a framing operation, the system controller 105 performs processing for determining that it is necessary to display the boundary display 36 and setting the rim line display determination flag to 1.

When entering this processing in step S2 in FIG. 5, the system controller 105 determines whether the release button 113a is being half-pressed (step S41).

When determining that the release button 113a is not being half-pressed, the system controller determines whether the image pickup optical system 201 is performing zoom driving (step S42). Note that, for example, when the zoom ring 210b is turning (or, when a zoom button is provided, the zoom button is being pressed), the system controller 105 determines that the image pickup optical system 201 is performing the zoom driving.

When determining that the image pickup optical system 201 is not performing the zoom driving, the system controller 105 determines whether the image pickup optical system 201 is performing moving image photographing (step S43).

When determining that the image pickup optical system 201 is not performing the moving image photographing, the system controller 105 determines whether the image pickup apparatus 100 is moving (step S44). Note that the system controller 105 monitors an output of the acceleration sensor or the angular velocity sensor of the camera shake sensor 108 and, when an output value is larger than a predetermined value, determines that the image pickup apparatus 100 is panned or tilted and is moving. The determining method is not limited to the above, but the system controller 105 may calculate a total amount of motion vectors of the same object in different frames and determine, based on the total amount of the motion vectors, whether the image pickup apparatus 100 is moving.

When determining that the image pickup apparatus 100 is not moving, the system controller 105 determines whether it is within a predetermined time from a live view display start (step S45). Note that the system controller 105 determines that it is within the predetermined time from the live view display start, for example, when it is within a predetermined time after the power supply of the image pickup apparatus 100 is turned on, when it is within a predetermined time after the image pickup apparatus 100 returns from a reproduction mode to a photographing standby state, or when it is within a predetermined time after the back display panel 114b is switched to the electronic viewfinder 114a.

When determining in step S45 that it is not within the predetermined time from the live view display start, the display controller 105a sets 0 in the rim line display determination flag (step S46).

On the other hand, when it is determined in step S41 that the release button 113a is being half-pressed, when it is determined in step S42 that the image pickup optical system 201 is performing the zoom driving, when it is determined in step S43 that the image pickup optical system 201 is performing the moving image photographing, when it is determined in step S44 that the image pickup apparatus 100 is moving, or when it is determined in step S45 that it is within the predetermined time from the live view display start, the display controller 105a sets 1 in the rim line display determination flag (step S47).

After performing step S46 or step S47, the display controller 105a returns from this processing.

Figure 9:
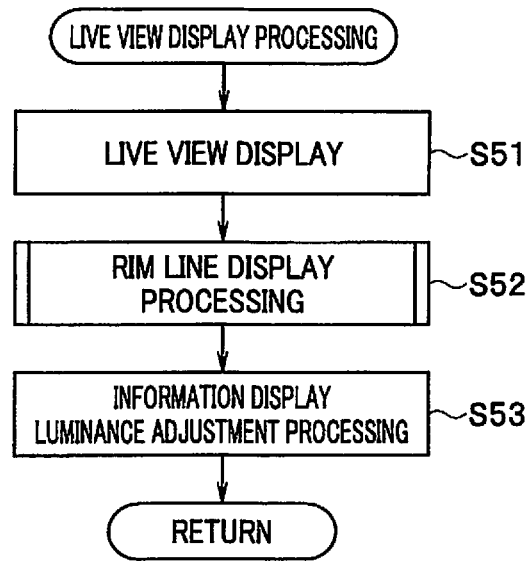
FIG. 9 is a flowchart showing live view display processing in the image pickup apparatus in the embodiment.

FIG. 9 is a flowchart showing live view display processing in the image pickup apparatus 100.

When entering this processing in step S3 in FIG. 5, the system controller 105 displays live view on the display device 114 according to setting of a live view display mode (step S51). In particular, a case in which the live view is displayed on the electronic viewfinder 114a is explained.

Modes that can be set in the live view display mode include a simulation mode, a finder mode, and a live view boost mode.

The simulation mode is a mode for performing live view conforming to a setting value of exposure and a setting value of a white balance. Therefore, as an example, when exposure correction of −1.5 is set and a white balance in the case in which tungsten light is used as a light source is set, live view simulating these setting values is performed.

The finder mode is a mode for prioritizing visibility of a finder and always performing display at proper exposure (gray level).

In general, an expert in photographing tends to prefer the simulation mode and a beginner tends to prefer the finder mode. Since exposure correction and the like are reflected on the live view in the simulation mode, the boundary display 36 tends to be required in more cases. Since the live view is always displayed at proper exposure in the finder mode, the boundary display 36 tends to be required in fewer cases.

The live view boost mode is a mode for performing live view display at easy-to-see brightness without reflecting a result of exposure correction. The live view boost mode is used in order to, when photographing a low-illuminance object such as a night scene or a starry sky, display the object in a bright and easy-to-see state and confirm a composition and a focus.

The system controller 105 further performs, on the displayed live view, rim line display processing for further displaying the boundary display 36 (step S52).

Subsequently, the system controller 105 performs information display luminance adjustment processing for appropriately adjusting luminance of information display (for example, an icon, a character, or an indicator in the information display region 34a, a grid line in the image display region 33, or the like) (step S53).

In general, when being affected by a strong light point such as a spotlight, human pupils narrow and less easily visually recognize a dark portion. Therefore, if a high-luminance icon, grid line, or the like is present in the electronic viewfinder 114a, when an object is dark, it is difficult to visually recognize details of an image displayed in the image display region 33, a boundary between the image display region 33 and the image non-display region 34, a boundary between the image display region 33 and the non-drawn region 32, and the like.

The luminance of the boundary display 36 also affects visibility of an image. However, the user sets the boundary display 36 to appropriate luminance in advance in the menu. Therefore, in this information display luminance adjustment processing, luminance balance adjustment is performed for brightness of an icon, a grid line, or the like, which is other information display, according to, for example, the luminance of the boundary display 36.

Note that, the luminance of the other information display is adjusted according to the luminance of the boundary display 36 here, but not limited thereto. For example, luminance of information display (the boundary display 36 and the other information display) may be adjusted according to luminance of an image displayed in the image display region 33. In this case, what should be done is to calculate both of average luminance of the entire image and partial highest luminance in the image, calculate luminance of the information display based on the average luminance, and calculate the calculated luminance of the information display to shift to a high luminance side according to the partial highest luminance. Consequently, even if a strong light point is present and the pupils decrease in size, it is possible to prevent the information display from becoming less easily visually recognized.

Figure 10:
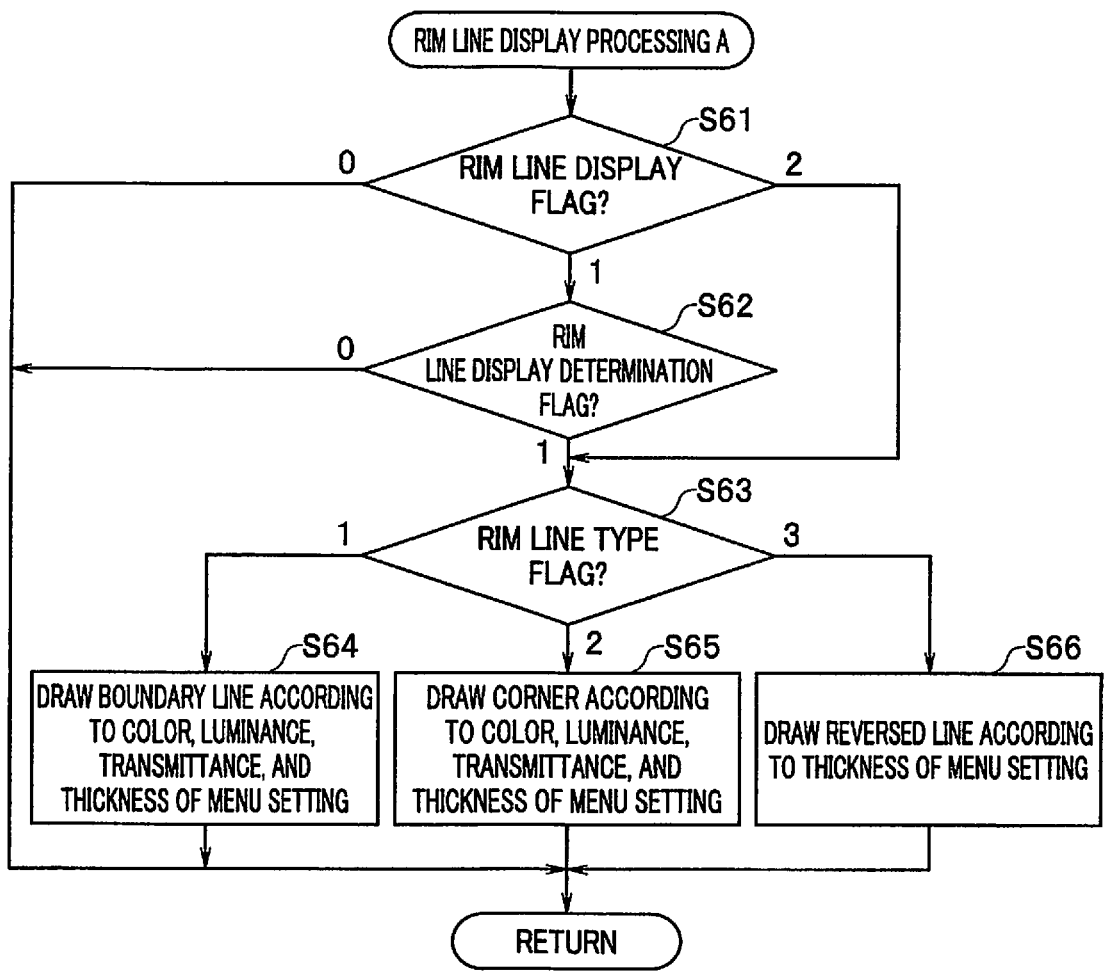
FIG. 10 is a flowchart showing rim line display processing A in the image pickup apparatus in the embodiment.

FIG. 10 is a flowchart showing the rim line display processing A in the image pickup apparatus 100.

When entering this processing in step S52 in FIG. 9, the system controller 105 confirms the rim line display flag (step S61).

When the rim line display flag is "1", that is, the image pickup apparatus 100 is set in the automatic display mode, the system controller 105 further confirms the rim line display determination flag (step S62).

When determining that the rim line display determination flag is "1", that is, the boundary display 36 is necessary for the image or when the rim line display flag is "2" in step S61, that is, the image pickup apparatus 100 is set in the forced display mode, the system controller 105 confirms the rim line type flag (step S63).

When the rim line type flag is "1", the system controller 105 draws the boundary line 36a as shown in the 4A field of FIG. 4 according to a color, luminance, transmittance, and thickness set in the rim line display form of the menu (step S64).

When the rim line type flag is "2" in step S63, the system controller 105 draws the corner display 36b shown in the 4B field of FIG. 4 according to the color, the luminance, the transmittance, and the thickness set in the rim line display form of the menu (step S65).

Further, when the rim line type flag is "3" in step S63, the system controller 105 draws the reversed display boundary line 36c shown in the 5A field of FIG. 4 according to the thickness set in the rim line display form of the menu (step S66).

When the processing in any one of steps S64 to S66 ends or the rim line display flag is "0" in step S61, that is, the image pickup apparatus 100 is set in the display off mode or when the rim line display determination flag is "0" in step S62, that is, it is determined that the boundary display 36 is unnecessary for the image, the system controller 105 returns from this processing.

Note that an example in which the boundary display 36 is drawn according to the color, the luminance, the transmittance, the thickness, and the like set in the menu is explained, but not limited to the above example. The display controller 105a may automatically set a color, luminance, transmittance, thickness, and the like of the boundary display 36 considering a color and luminance of the four sides of the image display region 33, a color and luminance of the image display outside region 35 circumscribing the image display region 33, and a color and luminance that can be displayed by the display element disposed on the inside of the electronic viewfinder 114a.

In this case, the display controller 105a only has to control the display device 114 to change at least one of the color, the luminance, and the transmittance (or, further, change the thickness) of the boundary display 36 according to luminance of the image display region 33 (luminance of an outer edge of the image display region 33) near a boundary with the image display outside region 35.

Figure 11:
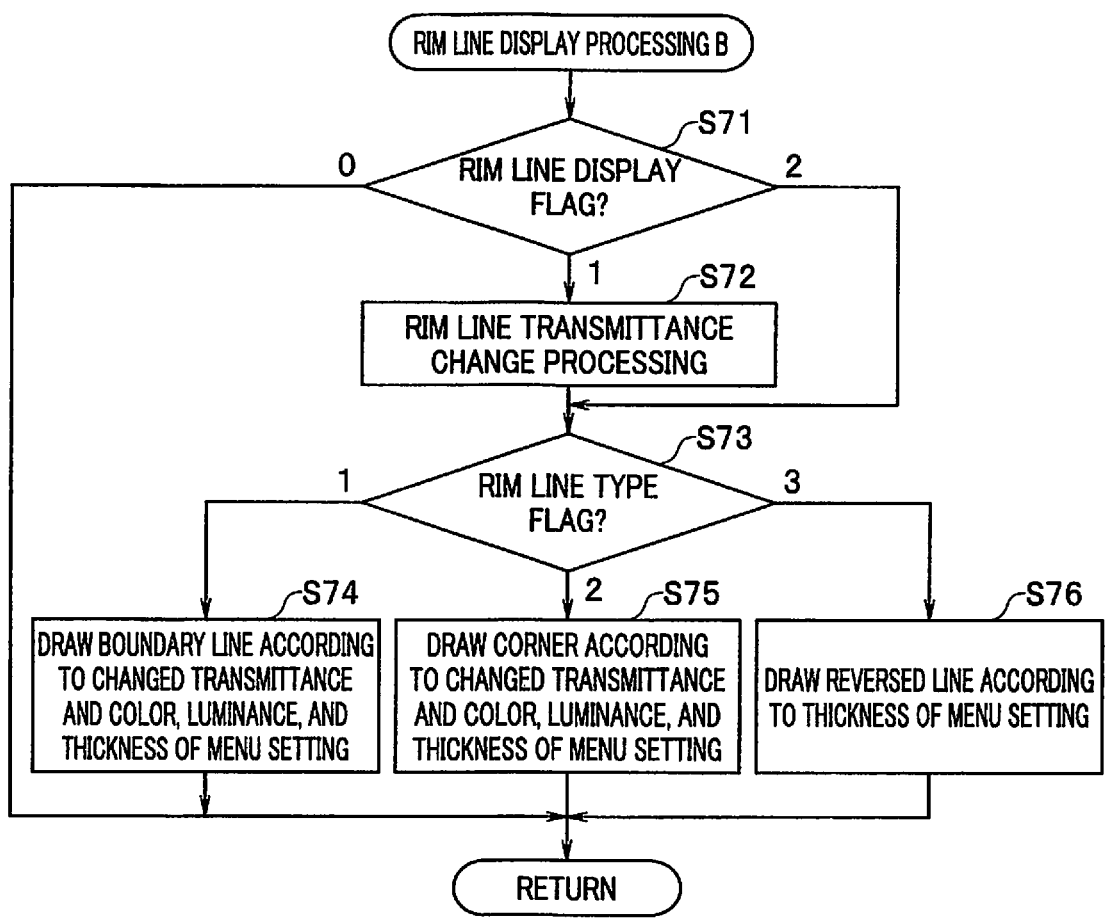
FIG. 11 is a flowchart showing rim line display processing B in the image pickup apparatus in the embodiment.

FIG. 11 is a flowchart showing rim line display processing B in the image pickup apparatus 100.

In the processing shown in FIG. 11, when the rim line display flag is "1", the boundary display 36 is always superimposed without relying on the rim line display determination flag and transmittance of the boundary display 36 is set as appropriate.

When entering this processing in step S52 in FIG. 9, the system controller 105 confirms the rim line display flag (step S71).

When the rim line display flag is "1", that is, the image pickup apparatus 100 is set in the automatic display mode, the system controller 105 performs rim line transmittance change processing for changing the transmittance of the boundary display 36 set in the menu (step S72).

Figure 12:
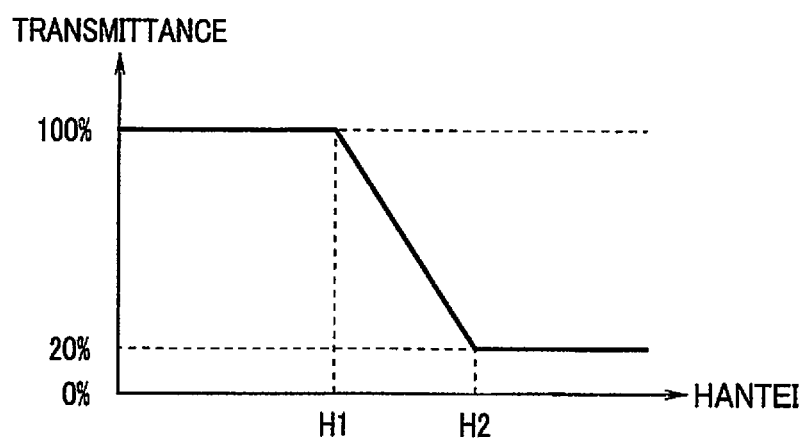
FIG. 12 is a chart showing an example in which transmittance of a boundary display is changed according to a value of a determination number index HANTEI in the rim line display processing B in the embodiment.

FIG. 12 is a chart showing an example in which the transmittance of the boundary display 36 is changed according to a value of the determination number index HANTEI in the rim line display processing B. Note that setting the transmittance as shown in FIG. 12 is based on the premise that the rim line display determination processing A shown in FIG. 6 in step S2 is performed and the determination number index HANTEI is already calculated.

In the example shown in FIG. 12, the transmittance of the boundary display 36 is set to 100% when the determination number index HANTEI is 0 to a first predetermined value H1. At the transmittance of 100%, the boundary display 36 is not displayed even if the boundary display 36 is superimposed. Therefore, an entire image present behind the boundary display 36 is seen and a finder visual field ratio of 100% is secured.

When the determination number index HANTEI exceeds the first predetermined value H1, the transmittance is monotonously reduced until the transmittance decreases to 20% at a second predetermined value H2 larger than the first predetermined value H1. Then, as the transmittance decreases, the boundary display 36 is gradually clearly visually recognized.

Thereafter, even if the determination number index HANTEI increases to be larger than the second predetermined value H2, the transmittance of 20% is maintained. Note that, although a lower limit value of the transmittance is set to 20% here, an appropriate value of approximately 10 to 30% is desirably set as the lower limit value. In this way, the transmittance is not reduced to 0% to secure visibility of an image to a certain degree and prevent the finder visual field ratio of 100% from being damaged.

Note that, the transmittance of the boundary display 36 is changed according to the value of the determination number index HANTEI here, but not limited to the above value. The transmittance of the boundary display 36 may be changed according to luminance of an image obtained as photometric data or the like.

In this case, the display controller 105a only has to control the display device 114 such that the luminance of the boundary display 36 becomes higher than the luminance of the image display outside region 35 and the transmittance of the boundary display 36 increases as the luminance of the image display region 33 near the boundary with the image display outside region 35 (the luminance of the outer edge of the image display region 33) increases. Consequently, high transmittance (for example, 100%) is not set with respect to high luminance (an outside or a relatively bright normal inside) and concentration of the photographer is not disturbed. Low transmittance (for example, 20%) is set with respect to low luminance (an extremely dark object or the like) and a boundary can be visually recognized.

When the processing in step S72 is performed or the rim line display flag is "2" in step S71, that is, the image pickup apparatus 100 is set in the forced display mode, the system controller 105 confirms the rim line type flag (step S73).

When the rim line type flag is "1", the system controller 105 draws the boundary line 36a shown in the 4A field of FIG. 4 according to the transmittance changed in step S72 (when step S72 is not performed, the transmittance set in the rim line display form of the menu) and the color, the luminance, and the thickness set in the rim line display form of the menu (step S74).

When the rim line type flag is "2" in step S73, the system controller 105 draws the corner display 36b shown in the 4B field of FIG. 4 according to the transmittance changed in step S72 (when step S72 is not performed, the transmittance set in the rim line display form of the menu) and the color, the luminance, and the thickness set in the rim line display form of the menu (step S75).

Further, when the rim line type flag is "3" in step S73, the system controller 105 draws the reversed display boundary line 36c shown in the 5A field of FIG. 4 according to the thickness set in the rim line display form of the menu (step S76).

When the processing in any one of steps S74 to S76 ends or the rim line display flag is "0" in step S71, that is, the image pickup apparatus 100 is set in the display off mode, the system controller 105 returns from this processing.

Figure 13:
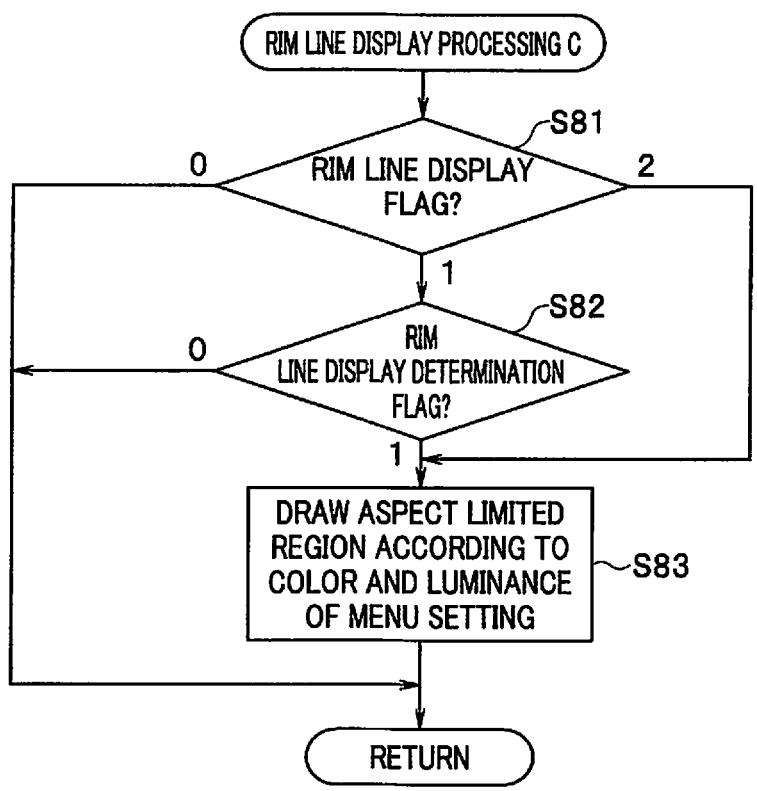
FIG. 13 is a flowchart showing rim line display processing C in the image pickup apparatus in the embodiment.

FIG. 13 is a flowchart showing rim line display processing C in the image pickup apparatus 100.

In this rim line display processing C, the image non-display region 34 functioning as the aspect limited display region in the drawn region 31 also functions as the boundary display 36.

When entering this processing in step S52 in FIG. 9, the system controller 105 confirms the rim line display flag (step S81).

When the rim line display flag is "1", that is, the image pickup apparatus 100 is set in the automatic display mode, the system controller 105 further confirms the rim line display determination flag (step S82).

When the rim line display determination flag is "1", that is, it is determined that the boundary display 36 is necessary for the image or when the rim line display flag is "2" in step S81, that is, the image pickup apparatus 100 is set in the forced display mode, the system controller 105 draws the aspect limited display region as shown in the 5B field of FIG. 4 according to the color and the luminance set in the rim line display form of the menu (step S83).

When an aspect ratio of the image display region 33 is a laterally longer ratio in comparison with an aspect ratio of the drawn region 31, it is desirable to reduce a total of left and right lateral widths of the aspect limited display region to 2 to 3% or less of lateral length of the drawn region 31. Similarly, when the aspect ratio of the image display region 33 is a longitudinally longer ratio in comparison with the aspect ratio of the drawn region 31, it is desirable to reduce a total of upper and lower longitudinal widths of the aspect limited display region to 2 to 3% or less of longitudinal length of the drawn region 31. Consequently, the image display region 33 can be secured as large as possible to prevent finder magnification from decreasing as much as possible.

An example in which the aspect limited display region is drawn according to the color and the luminance set in the menu is explained, but not limited to the above example. The display controller 105a may automatically set a color and luminance of the aspect limited display region considering a color and luminance of the four sides of the image display region 33 and a color and luminance that can be displayed by the display element disposed on the inside of the electronic viewfinder 114a.

In this case, the display controller 105a only has to control the display device 114 to set at least one of the luminance and the color of the image non-display region 34 such that at least one of a condition that a difference between luminance of the outer edge of the image display region 33 (when the image display region 33 is rectangular, four sides) and luminance of the image non-display region 34 (the aspect limited display region) is equal to or larger than a first predetermined value and a condition that a difference between chromaticity of the outer edge of the image display region 33 (when the image display region 33 is rectangular, four sides) and chromaticity of the image non-display region 34 (the aspect limited display region) is equal to or larger than a second predetermined value.

In this way, the boundary display 36 is not limited to be displayed by a line, a dot, or the like. The image non-display region 34 functioning as the aspect limited display region surrounding the image display region 33 may also function as the boundary display 36.

When the processing in step S83 ends or the rim line display flag is "0" in step S81, that is, the image pickup apparatus 100 is set in the display off mode or when the rim line display determination flag is "0" in step S82, that is, it is determined that the boundary display 36 is unnecessary for the image, the system controller 105 returns from this processing.

Figure 14:
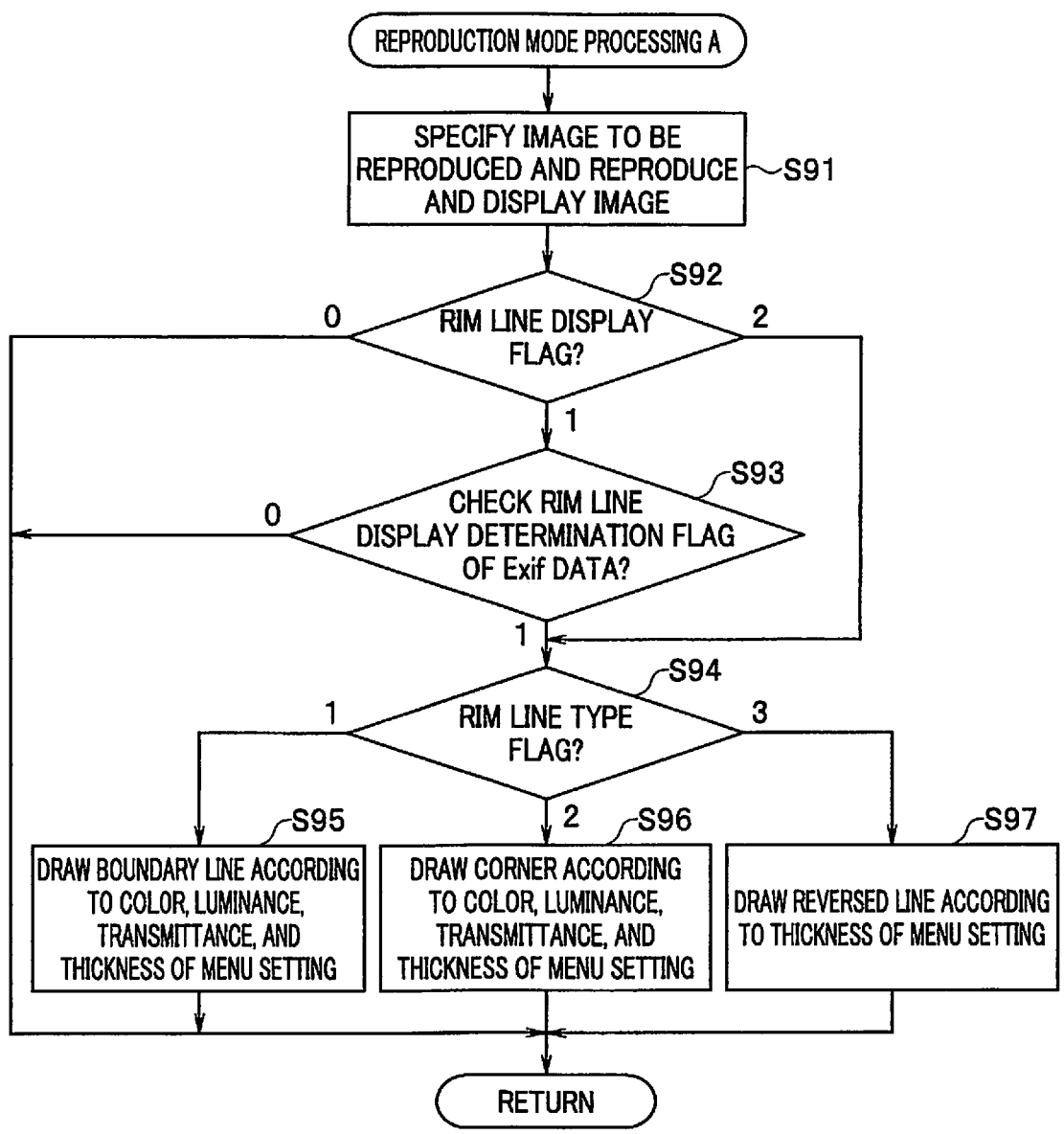
FIG. 14 is a flowchart showing reproduction mode processing A in the image pickup apparatus in the embodiment.

FIG. 14 is a flowchart showing reproduction mode processing A in the image pickup apparatus 100.

When entering this processing in step S13 in FIG. 5, the system controller 105 specifies an image to be reproduced, reads the specified image from an image file of the external memory 115, and reproduces and displays the image on the display device 114 (step S91). In particular, a case in which the system controller 105 reproduces and displays the image on the electronic viewfinder 114a is explained.

The system controller 105 confirms the rim line display flag (step S92).

When the rim line display flag is "1", that is, the image pickup apparatus 100 is set in the automatic display mode, the system controller 105 reads a rim line display determination flag recorded in Exif data of an image file of the specified image and confirms whether the boundary display 36 is displayed in live view during photographing (step S93).

When the rim line display determination flag is "1", that is, it is determined that the boundary display 36 is necessary for the image or when the rim line display flag is "2" in step S92, that is, the image pickup apparatus 100 is set in the forced display mode, the system controller 105 further confirms the rim line type flag (step S94).

When the rim line type flag is "1", the system controller 105 draws the boundary line 36a as shown in the 4A field of FIG. 4 according to the color, the luminance, the transmittance, and the thickness set in the rim line display form of the menu (step S95).

When the rim line type flag is "2" in step S94, the system controller 105 draws the corner display 36b shown in the 4B field of FIG. 4 according to the color, the luminance, the transmittance, and the thickness set in the rim line display form of the menu (step S96).

Further, when the rim line type flag is "3" in step S94, the system controller 105 draws the reversed display boundary line 36c shown in the 5A field of FIG. 4 according to the thickness set in the rim line display form of the menu (step S97).

When the processing in any one of steps S95 to S97 ends or the rim line display flag is "0" in step S92, that is, the image pickup apparatus 100 is set in the display off mode or the rim line display determination flag is "0" in step S93, that is, it is determined that the boundary display 36 is unnecessary for the image, the system controller 105 returns from this processing.

FIG. 15 is a flowchart showing reproduction mode processing B in the image pickup apparatus 100.

When entering this processing in step S13 in FIG. 5, the system controller 105 specifies an image to be reproduced, reads the specified image from the image file of the external memory 115, and reproduces and displays the image on the display device 114 (step S101). In particular, a case in which the system controller 105 reproduces and displays the image on the electronic viewfinder 114a is explained.

Subsequently, the system controller 105 performs, on the reproduced image, the rim line display determination processing A shown in FIG. 6 and sets the rim line display determination flag (step S102).

In the reproduction mode processing A shown in FIG. 14, the system controller 105 reads the rim line display determination flag recorded in the Exif data and confirms whether the boundary display 36 is displayed in the live view during photographing. However, when the live view display mode during photographing is the live view boost mode, the boundary display 36 is sometimes unnecessary. On the other hand, when an actually photographed image is reproduced and confirmed, the boundary display 36 is sometimes necessary. Accordingly, in the reproduction mode processing B, the system controller 105 performs the rim line display determination processing A on the reproduced image.

Subsequently, the system controller 105 confirms the rim line display flag (step S103).

When the rim line display flag is "1", that is, the image pickup apparatus 100 is set in the automatic display mode, the system controller 105 confirms the rim line display determination flag set in step S102 (step S104).

When the rim line display determination flag is "1", that is, it is determined that the boundary display 36 is necessary for the image or when the rim line display flag is "2" in step S103, that is, the image pickup apparatus 100 is set in the forced display mode, the system controller 105 further confirms the rim line type flag (step S105).

When the rim line type flag is "1", the system controller 105 draws the boundary line 36a shown in the 4A field of FIG. 4 according to the color, the luminance, the transmittance, and the thickness set in the rim line display form of the menu (step S106).

When the rim line type flag is "2" in step S105, the system controller 105 draws the corner display 36b shown in the 4B field of FIG. 4 according to the color, the luminance, the transmittance, and the thickness set in the rim line display form of the menu (step S107).

Further, when the rim line type flag is "3" in step S105, the system controller 105 draws the reversed display boundary line 36c shown in the 5A field of FIG. 4 according to the thickness set in the rim line display form of the menu (step S108).

When the processing in any one of steps S106 to S108 ends or the rim line display flag is "0" in step S103, that is, the image pickup apparatus 100 is set in the display off mode or the rim line display determination flag is "0" in step S104, that is, it is determined that the boundary display 36 is unnecessary for the image, the system controller 105 returns from this processing.

Note that, whereas image data recorded in the external memory 115 is set as a target of display in the reproduction display, image data of a buffer memory is usually set as a target of display in the rec view processing. The rec view processing in step S10 in FIG. 5 is the same as the reproduction mode processing B shown in FIG. 15 except the difference of the image data set as the target. Therefore, illustration and explanation of the rec view processing are omitted.

According to such an embodiment, since the boundary display 36 is drawn in the drawn region 31, the boundary between the image display region 33 and the image display outside region 35 can visually confirmed. Further, since at least one side among the four sides of the recorded image is set in contact with any one of the four sides of the drawn region 31, high finder magnification can be secured.

Since the image display outside region 35 is the region other than the drawn region 31, the drawn region 31 can be used for the drawing of the recorded image. The finder magnification can be set as high as possible. Since the image display outside region 35 is the region configured by the light blocking mask of the display device 114, similarly, the finder magnification can be set as high as possible.

On the other hand, since the image display outside region 35 is the aspect limited display region in the drawn region 31, the aspect limited display region can be used as the boundary display 36 as well and effectively used.

When the boundary display 36 is drawn only when the difficulty degree of the visibility of the boundary between the image display region 33 and the image display outside region 35 is equal to or larger than the predetermined value, the finder visual field ratio of 100% is maintained when the boundary can be visually recognized even if the boundary display 36 is absent. The concentration of the photographer is not disturbed.

Since the boundary display 36 is drawn when the live view display and the reproduction display are performed, the boundary can be easily visually recognized on the live view image and on the reproduced image.

Similarly, since the boundary display 36 is drawn when the rec view display is performed, the boundary can be easily visually recognized on the rec view image.

At least one of the color, the luminance, and the transmittance of the boundary display 36 is changed according to the luminance of the image display region 33 near the boundary with the image display outside region 35 and the boundary display 36 is drawn. Therefore, it is possible to visually recognize the boundary without disturbing the concentration of the photographer.

Since the luminance of the boundary display 36 is set to be higher than the luminance of the image display outside region 35, it is possible to clearly visually recognize the boundary between the image display region 33 and the image display outside region 35, which is generally a dark part. Since the transmittance of the boundary display 36 increases as the luminance of the image display region 33 near the boundary with the image display outside region 35 increases, it is possible to make the boundary display 36 less conspicuous when necessity decreases and not to disturb the concentration of the photographer.

At least one of the luminance and the color of the image non-display region 34 is set such that at least one of the condition that the difference between the luminance of the outer edge of the image display region 33 and the luminance of the image non-display region 34 is equal to or larger than the first predetermined value and the condition that the difference between the chromaticity of the outer edge of the image display region 33 and the chromaticity of the image non-display region 34 is equal to or larger than the second predetermined value, is satisfied. Therefore, the image non-display region 34 functions as the boundary display 36 as well. The boundary between the image display region 33 and the image display outside region 35 can be visually recognized.

Note that, in the above explanation, the example is explained in which the processor including the hardware reads and executes the processing program stored in the storage device (or the recording medium) to thereby realize the functions of the respective blocks that perform the control of the camera main body 10, but not limited to the above example. For example, the respective blocks that perform the control of the camera main body 10 may be configured as dedicated electronic circuits.

In the above explanation, the case in which the present invention is the image pickup apparatus is mainly explained, but not limited to the above case. The present invention may be an image display method for the image pickup apparatus or may be a processing program for causing a computer to perform the same processing as the processing by the image pickup apparatus, a non-transitory recording medium readable by a computer that records the processing program, or the like.

Further, the present invention is not limited to the above-mentioned embodiment per se. In an implementation stage, constituent elements can be modified and embodied in a range not departing from the gist of the present invention. Modes of various inventions can be formed by appropriate combinations of a plurality of constituent elements disclosed in the embodiment. For example, several constituent elements may be deleted from all the constituent elements disclosed in the embodiment. Further, constituent elements in different embodiments may be combined as appropriate. In this way, it goes without saying that various modifications and applications can be made within the range not departing from the gist of the invention.

What is claimed is:

1. An image pickup apparatus comprising:
an image pickup device configured to pick up an optical image and generate a picked-up image;
a display device including, in a finder loupe visual field, an image display region where a recorded image, which is a part of or a whole of the picked-up image, is drawn in a drawn region and an image display outside region other than the image display region; and
a display controller configured to control the display device to draw, in the drawn region, a boundary display for making a boundary between the image display region and the image display outside region visually recognizable, wherein
the display controller determines a difficulty degree of visibility of the boundary between the image display region and the image display outside region and controls the display device to draw the boundary display when the difficulty degree is equal to or larger than a predetermined value and not to draw the boundary display when the difficulty degree is smaller than the predetermined value.

2. The image pickup apparatus according to claim 1, wherein the image display outside region is a region other than the drawn region.

3. The image pickup apparatus according to claim 1, wherein the image display outside region is a region configured by a light blocking mask of the display device.

4. The image pickup device according to claim 1, wherein the image display outside region is an aspect limited display region in the drawn region.

5. The image pickup apparatus according to claim 1, wherein the display controller controls the display device to draw the boundary display when live view display is performed and when reproduction display is performed.

6. An image pickup apparatus comprising:
an image pickup device configured to pick up an optical image and generate a picked-up image;
a display device including, in a finder loupe visual field, an image display region where a recorded image, which is a part of or a whole of the picked-up image, is drawn in a drawn region and an image display outside region other than the image display region; and
a display controller configured to control the display device to draw, in the drawn region, a boundary display for making a boundary between the image display region and the image display outside region visually recognizable, wherein
the display controller controls the display device to change at least one of a color, luminance, and transmittance of the boundary display according to luminance of the image display region near a boundary with the image display outside region and controls the display device such that the luminance of the boundary display becomes higher than luminance of the image display outside region and the transmittance of the boundary display becomes higher as the luminance of the image display region near the boundary with the image display outside region increases.

7. An image display method for an image pickup apparatus comprising:
- drawing a recorded image, which is a part of or a whole of a picked-up image generated by picking up an optical image, in an image display region in a drawn region;
- displaying, in a finder loupe visual field, the image display region and an image display outside region other than the image display region;
- determining a difficulty degree of visibility of a boundary between the image display region and the image display outside region;
- drawing, when the difficulty degree is equal to or larger than a predetermined value, in the drawn region, a boundary display for making the boundary between the image display region and the image display outside region visually recognizable; and
- not drawing the boundary display when the difficulty degree is smaller than the predetermined value.

8. An image display method for an image pickup apparatus comprising:
- drawing a recorded image, which is a part of or a whole of a picked-up image generated by picking up an optical image, in an image display region in a drawn region;
- displaying, in a finder loupe visual field, the image display region and an image display outside region other than the image display region;
- drawing, in the drawn region, a boundary display for making a boundary between the image display region and the image display outside region visually recognizable;
- changing at least one of a color, luminance, and transmittance of the boundary display according to luminance of the image display region near a boundary with the image display outside region; and
- setting the luminance of the boundary display to be higher than luminance of the image display outside region and setting the transmittance of the boundary display to be higher as the luminance of the image display region near the boundary with the image display outside region increases.

9. A computer-readable non-transitory recording medium that records a processing program,
the processing program causing a computer to:
- draw a recorded image, which is a part of or a whole of a picked-up image generated by picking up an optical image, in an image display region in a drawn region;
- display, in a finder loupe visual field, the image display region and an image display outside region other than the image display region;
- determine a difficulty degree of visibility of a boundary between the image display region and the image display outside region;
- draw, when the difficulty degree is equal to or larger than a predetermined value, in the drawn region, a boundary display for making the boundary between the image display region and the image display outside region visually recognizable; and
- not draw the boundary display when the difficulty degree is smaller than the predetermined value.

10. A computer-readable non-transitory recording medium that records a processing program,
the processing program causing a computer to:
- draw a recorded image, which is a part of or a whole of a picked-up image generated by picking up an optical image, in an image display region in a drawn region;
- display, in a finder loupe visual field, the image display region and an image display outside region other than the image display region;
- draw, in the drawn region, a boundary display for making a boundary between the image display region and the image display outside region visually recognizable;
- change at least one of a color, luminance, and transmittance of the boundary display according to luminance of the image display region near a boundary with the image display outside region; and
- set the luminance of the boundary display to be higher than luminance of the image display outside region and set the transmittance of the boundary display to be higher as the luminance of the image display region near the boundary with the image display outside region increases.

* * * * *